United States Patent
Semaan et al.

(10) Patent No.: US 9,872,256 B2
(45) Date of Patent: Jan. 16, 2018

(54) USER EQUIPMENT AND A METHOD FOR POWER CONTROL OF UPLINK TRANSMISSIONS

(71) Applicant: Telefonaktiebolaget L M Ericsson (publ), Stockholm (SE)

(72) Inventors: Eliane Semaan, Vällingby (SE); Erik Dahlman, Stockholm (SE); David Hammarwall, Vallentuna (SE); Shaohua Li, Beijing (CN); Imadur Rahman, Sollentuna (SE); Xinghua Song, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 110 days.

(21) Appl. No.: 14/759,287

(22) PCT Filed: Jul. 15, 2013

(86) PCT No.: PCT/SE2013/050903
§ 371 (c)(1),
(2) Date: Jul. 6, 2015

(87) PCT Pub. No.: WO2014/109687
PCT Pub. Date: Jul. 17, 2014

(65) Prior Publication Data
US 2015/0358915 A1 Dec. 10, 2015

Related U.S. Application Data

(60) Provisional application No. 61/750,932, filed on Jan. 10, 2013.

(51) Int. Cl.
*H04L 12/28* (2006.01)
*H04W 52/14* (2009.01)
(Continued)

(52) U.S. Cl.
CPC ......... *H04W 52/146* (2013.01); *H04W 52/34* (2013.01); *H04W 52/365* (2013.01); *H04W 52/367* (2013.01)

(58) Field of Classification Search
CPC . H04W 52/146; H04W 52/34; H04W 52/367; H04W 52/365; H04W 72/0413;
(Continued)

(56) References Cited

U.S. PATENT DOCUMENTS

2005/0138166 A1 6/2005 Blanchet
2011/0275403 A1* 11/2011 Chen ............... H04W 52/146
455/522

(Continued)

FOREIGN PATENT DOCUMENTS

EP 2 492 763 8/2012

OTHER PUBLICATIONS

PCT International Search Report for International application No. PCT/SE2013/050903, dated Apr. 22, 2014.
(Continued)

*Primary Examiner* — Noel Beharry
*Assistant Examiner* — Lionel Preval
(74) *Attorney, Agent, or Firm* — Baker Botts, LLP

(57) ABSTRACT

A User Equipment (UE) and a method performed by the UE for power control of uplink transmissions, when the UE is connected in dual connectivity mode to at least a first network node and a second network node are provided. The method comprises determining to perform a first uplink transmission to the first network node and a second uplink transmission to the second network node, the uplink transmissions to be performed simultaneously. The method also comprises determining a respective first and second uplink transmission power for the first and the second uplink transmission; and transmitting the first and the second uplink
(Continued)

transmissions at the first and the second uplink transmission power respectively when the sum of the first and second uplink transmission power is below a maximum transmission power.

27 Claims, 15 Drawing Sheets

(51) Int. Cl.
*H04W 52/34* (2009.01)
*H04W 52/36* (2009.01)

(58) Field of Classification Search
CPC ............ H04W 52/325; H04W 52/346; H04W 72/0453; H04W 24/02; H04W 52/30; H04W 72/1278; H04W 74/004; H04W 72/1268; H04L 5/001
IPC ............... H04W 52/146, 52/34, 52/365, 52/367, 72/044
See application file for complete search history.

(56) References Cited

U.S. PATENT DOCUMENTS

| | | | |
|---|---|---|---|
| 2012/0079140 A1 | 3/2012 | Bar-Niv et al. | |
| 2012/0265913 A1 | 10/2012 | Suumaki et al. | |
| 2012/0324067 A1 | 12/2012 | Hari et al. | |
| 2014/0056278 A1* | 2/2014 | Marinier | H04W 72/044 370/330 |
| 2015/0264666 A1* | 9/2015 | Yi | H04L 5/001 370/329 |
| 2015/0341864 A1* | 11/2015 | Yang | H04W 52/146 455/522 |

OTHER PUBLICATIONS

3GPP RAN WS on Rel-12 and onwards; Ljubljana, Slovenia; LTE Release 12 and Beyond (RWS-120003), Jun. 11-12, 2012.

* cited by examiner

USER EQUIPMENT AND A METHOD FOR POWER CONTROL OF UPLINK TRANSMISSIONS

PRIORITY

This nonprovisional application is a U.S. National Stage Filing under 35 U.S.C. §371 of International Patent Application Serial No. PCT/SE2013/050903 filed Jul. 15, 2013, and entitled "A USER EQUIPMENT AND A METHOD FOR POWER CONTROL OF UPLINK TRANSMISSIONS" which claims priority to U.S. Provisional Patent Application No. 61/750,932 filed Jan. 10, 2013, both of which are hereby incorporated by reference in their entirety.

TECHNICAL FIELD

The present disclosure relates to power control of uplink transmissions and in particular to power control of uplink transmissions when the user Equipment, UE, is in dual connectivity mode.

BACKGROUND

In a typical cellular radio system, wireless terminals (also known as mobile stations and/or User Equipments, UEs) communicate via a Radio Access Network, RAN, to one or more core networks. The RAN covers a geographical area which is divided into cell areas, with each cell area being served by a base station, e.g. a radio base station, RBS, which in some networks may also be called, for example, a "NodeB" (Universal Mobile Telecommunications System, UMTS) or "eNodeB" (Long Term Evolution, LTE). A cell is a geographical area where radio coverage is provided by the radio base station equipment at a base station site. Each cell is identified by an identity within the local radio area, which is broadcast in the cell. The base stations communicate over the air interface operating on radio frequencies with the UEs within range of the base stations.

In some versions of the RAN, several base stations are typically connected (e.g., by landlines or microwave) to a controller node (such as a Radio Network Controller, RNC) or a Base Station Controller, BSC) which supervises and coordinates various activities of the plural base stations connected thereto. The radio network controllers are typically connected to one or more core networks.

The UMTS is a third generation mobile communication system, which evolved from the second generation (2G) Global System for Mobile Communications, GSM. UMTS Terrestrial Radio Access Network, UTRAN, is essentially a radio access network using Wideband Code Division Multiple Access, WCDMA, for UEs. In a forum known as the Third Generation Partnership Project, 3GPP, telecommunications suppliers propose and agree upon standards for third generation networks and UTRAN specifically, and investigate enhanced data rate and radio capacity. The 3GPP has developed specifications for the Evolved Universal Terrestrial Radio Access Network, E-UTRAN. The E-UTRAN comprises the LTE and System Architecture Evolution, SAE. LTE is a variant of a 3GPP radio access technology wherein the radio base station nodes are connected to a core network (via Access Gateways, or AGWs) rather than to RNC nodes. In general, in LTE the functions of an RNC node are distributed between the RBS nodes (eNodeBs in LTE) and AGWs. As such, the RAN of an LTE system has an essentially "flat" architecture comprising radio base station nodes without reporting to RNC nodes.

LTE uses Orthogonal Frequency-Division Multiplexing, OFDM, in the downlink and Discrete Fourier Transform, DFT-spread OFDM in the uplink. FIG. 1a illustrates a basic LTE downlink physical resource in terms of a time-frequency grid, where each resource element corresponds to one OFDM subcarrier during one OFDM symbol interval. In the time domain, LTE downlink transmissions are organized into radio frames of 10 ms, each radio frame consisting of ten equally-sized subframes of length $T_{subframe}=1$ ms, as illustrated in FIG. 1b.

The resource allocation in LTE is typically described in terms of resource blocks, RB, where an RB corresponds to one slot (0.5 ms) in the time domain and 12 contiguous subcarriers in the frequency domain. A pair of two adjacent RBs in time direction (1.0 ms) is known as a RB pair. RBs are numbered in the frequency domain, starting with 0 from one end of the system bandwidth.

In the Frequency domain, LTE downlink uses a 15 KHz sub-carrier spacing. Thus, an RB corresponds to one slot (0.5 ms) in the time domain and 12 contiguous sub-carriers in the frequency domain. A Resource Element, RE, is then defined as one sub-carrier in the frequency domain, and the duration of one OFDM symbol in the time domain.

Physical layer channels in the LTE uplink are provided by the Physical Random Access Channel, PRACH; the Physical Uplink Shared Channel, PUSCH); and the Physical Uplink Control Channel, PUCCH. PUCCH transmissions are allocated specific frequency resources at the edges of the uplink bandwidth (e.g. multiples of 180 KHz in LTE depending on the system bandwidth). PUCCH is mainly used by the UE to transmit control information in the uplink, only in subframes in which the UE has not been allocated any RBs for PUSCH transmission. The control signalling may consist of Hybrid Automatic Repeat Request, HARQ, feedback as a response to a downlink transmission, Channel Status Reports, CSRs, scheduling requests, Channel Quality Indicators, CQIs, etc.

On the other hand, PUSCH is mainly used for data transmissions. However, this channel is also used for data-associated control signalling (e.g. transport format indications, Multiple Input Multiple Output, MIMO, parameters, etc.). This control information is crucial for processing the uplink data and is therefore transmitted together with that data.

The notion of Virtual Resource Blocks, VRBs and Physical RBs, PRBs has been introduced in LTE. The actual resource allocation to a UE is made in terms of VRB pairs. There are two types of resource allocations, localised and distributed. In the localised resource allocation, a VRB pair is directly mapped to a PRB pair, hence two consecutive and localised VRB are also placed as consecutive PRBs in the frequency domain. On the other hand, the distributed VRBs are not mapped to consecutive PRBs in the frequency domain; thereby providing frequency diversity for data channel transmitted using these distributed VRBs.

Downlink transmissions are dynamically scheduled, e.g., in each subframe the base station transmits control information about to which terminals data is transmitted and upon which resource blocks the data is transmitted, in the current downlink subframe. This control signalling is typically transmitted in the first 1, 2, 3 or 4 OFDM symbols in each subframe and the number n=1, 2, 3 or 4 is known as the Control Format Indicator, CFI, indicated by the physical CFI channel, PCFICH, transmitted in the first symbol of the control region. The control region also contains Physical Downlink Control CHannels, PDCCH and possibly also Physical HARQ Indication Channels, PHICH, carrying ACK/NACK for the uplink transmission.

The downlink subframe also comprises Common Reference Symbols, CRS, which are known to the receiver and used for coherent demodulation of e.g. the control information. A downlink system with CFI=3 OFDM symbols as control is illustrated in FIG. 1c.

FIG. 1d shows an example uplink transmission subframe. In terms of the uplink, UL, Sounding Reference Signals, SRSs, are known signals that are transmitted by UEs so that the eNodeB may estimate different uplink-channel properties. The RSRs have time duration of a single OFDM symbol. These estimates may be used for uplink scheduling and link adaptation but also for downlink multiple antenna transmission, especially in case of Time Division Duplex, TDD, where the uplink and downlink use the same frequencies. The SRSs are defined in 3GPP TS 36.211 "Evolved Universal Terrestrial Radio Access (E-UTRA); Physical channels and modulation", incorporated herein by reference in its entirety. The SRSs may be transmitted in the last symbol of a 1 ms uplink subframe. For the case of TDD, the SRSs may also be transmitted in the special slot, Uplink Pilot Time Slot, UpPTS. The length of UpPTS may be configured to be one or two symbols. FIG. 1e shows an example 10 ms radio frame for TDD, wherein in each of the two 5-slot subframes the ratio of downlink, DL, slots to UL slots is 3DL:2UL, and wherein up to eight symbols may be set aside for SRSs. The configuration of SRS symbols, such as SRS bandwidth, SRS frequency domain position, SRS hopping pattern and SRS subframe configuration are set semi-statically as a part of Radio Resource Control, RRC, information element, as explained by 3GPP TS 36.331 "Evolved Universal Terrestrial Radio Access (E-UTRA); Radio Resource Control (RRC); Protocol specification", incorporated herein by reference in its entirety. Therein it is explained that the information element (IE) SoundingRS-UL-Config is used to specify the uplink Sounding RS configuration for periodic and aperiodic sounding.

Dual connectivity is a feature defined from the UE perspective wherein the UE may simultaneously receive and transmit to at least two different network points. For example, FIG. 1f illustrates a dual connectivity scenario wherein a wireless terminal participates both in a connection with a macro RBS node and a Low Power Node, LPN, node. Dual connectivity is one of the features that are considered for standardisation within the umbrella work of small cell enhancements for LTE within 3GPP Rel-12.

Dual connectivity is defined for the case when the aggregated network points operate on the same or separate frequency. Each network point that the UE is aggregating may define a stand-alone cell or it may not define a stand-alone cell. It is further foreseen that from the UE perspective, the UE may apply some form of Time Division Multiplexing, TDM, scheme between the different network points that the UE is aggregating. This implies that the communication on the physical layer to and from the different aggregated network points may not be truly simultaneous.

Dual connectivity as a feature bears many similarities with carrier aggregation and Coordinated Multi Point, CoMP. A differentiating factor is that dual connectivity is designed considering a relaxed backhaul and less stringent requirements on synchronisation requirements between the network points, and thus is in contrast to carrier aggregation and CoMP wherein tight synchronisation and a low-delay backhaul are assumed between connected network points.

Dual connectivity can be utilised in many ways. Two example ways, described in more detail below, are RRC diversity and Decoupled uplink (UL) and downlink (DL).

With RRC Diversity, RRC signalling messages may be communicated with the UE via both an anchor link and a booster link. It is assumed that the RRC and the Packet Data Convergence Protocol, PDCP, protocol termination point lies in the anchor node and thus signalling messages are routed as duplicate PDCP Payload Data Units, PDUs, also via the backhaul link between anchor/macro and booster/LPN. On the UE side, duplicate PHY/MAC/RLC instances are required, as illustrated in FIG. 1g, and a separate RACH procedure to obtain time synchronisation and CRNTI for each link. As improved mobility robustness is one of the major arguments for dual connectivity, RRC diversity is an especially interesting feature for the transmission of handover related messages such as UE measurement reports and RRC-reconfiguration requests ("handover commands").

A second useful scenario of dual connectivity is decoupled UL/DL. The main benefit with this feature is that it allows the UE to send UL transmission always to the point (e.g. macro RBS or LPN) with lowest pathloss at the same time as it receives DL transmission from the network point with highest received power. This is useful when the UE is operating in a heterogeneous network with a macro cell and LPNs that have relatively large difference in transmission power, as illustrated in FIG. 1h. The main deployment scenario studied is a scenario wherein the aggregated network nodes have a relaxed backhaul between them and the network nodes.

Uplink power control plays an important role in radio resource management which has been adopted in most modern communication systems. It balances the needs to maintain the link quality against the needs to minimise interference to other users of the system and to maximise the battery life of the terminal.

In LTE, the aim of power control is to determine the average power over a Single Carrier Frequency Division Multiple Access, SC-FDMA, symbol and it is applied for both common channel and dedicated channel (PUCCH/PUSCH/SRS). A combined open-loop and closed-loop power control was adopted as formulated in Expression (1).

$$P_{UE} = \min\{P_{CMAX}, \underbrace{P_0 + \alpha \cdot PL}_{\text{open-loop set-point}} + \underbrace{f(i)}_{\text{closed-loop adjustment}} + \underbrace{\Delta_{TF}(i)}_{\text{MCS offset}} + \underbrace{10\log_{10}M}_{\text{bandwidth factor}}\} \quad (1)$$

In terms of open loop power control, the UE calculates a basic open-loop set-point based on the path-loss estimate and an eNodeB controlled semi-static base level ($P_0$) comprising a nominal power level common for all UEs in the cell and a UE-specific offset. In terms of closed-loop power control, the eNodeB updates the dynamic adjustment relative to set-point, and the UE adjusts the transmit power upon the Transmit Power Control, TPC, commands. It is also possible to connect the power control to modulation and coding scheme used for the uplink transmission.

A UE operating in a dual connectivity mode needs to share its UL power between the UL links towards different nodes/eNBs that the UE simultaneously transmits to on the same carrier or in separate carrier. The UL power sharing is mainly problematic when the UE reaches its maximum allowed transmission power, typically 23 dBm.

SUMMARY

The object is to obviate at least some of the problems outlined above. In particular, it is an object to provide a UE and a method performed by the UE for power control of uplink transmissions, when the UE being connected in dual connectivity mode to at least a first network node and a second network node. These objects and others may be obtained by providing a UE and a method performed by a UE according to the independent claims attached below.

According to an aspect a method performed by a UE for power control of uplink transmissions, when the UE is connected in dual connectivity mode to at least a first network node and a second network node. The method comprises determining to perform a first uplink transmission to the first network node and a second uplink transmission to the second network node, the uplink transmissions to be performed simultaneously. The method also comprises determining a respective first and second uplink transmission power for the first and the second uplink transmission; and transmitting the first and the second uplink transmissions at the first and the second uplink transmission power respectively when the sum of the first and second uplink transmission power is below a maximum transmission power.

According to an aspect, a UE adapted for power control of uplink transmissions, the UE being connected in dual connectivity mode. The UE comprises a determining unit adapted for determining to perform a first uplink transmission to the first network node and a second uplink transmission to the second network node, the uplink transmissions to be performed simultaneously, and for determining a respective first and second uplink transmission power for the first and the second uplink transmission. The UE also comprises a transmitting unit adapted for transmitting the first and the second uplink transmissions at the first and the second uplink transmission power respectively when the sum of the first and second uplink transmission power is below a maximum transmission power.

The method performed by the UE and the UE performing the method may have several advantages. One possible advantage is that a power limited UE may be enabled to control and share its transmission power between simultaneous transmissions on the same carrier, and also on separate carriers.

BRIEF DESCRIPTION OF DRAWINGS

Embodiments will now be described in more detail in relation to the accompanying drawings, in which.

DETAILED DESCRIPTION

Figure 1A:
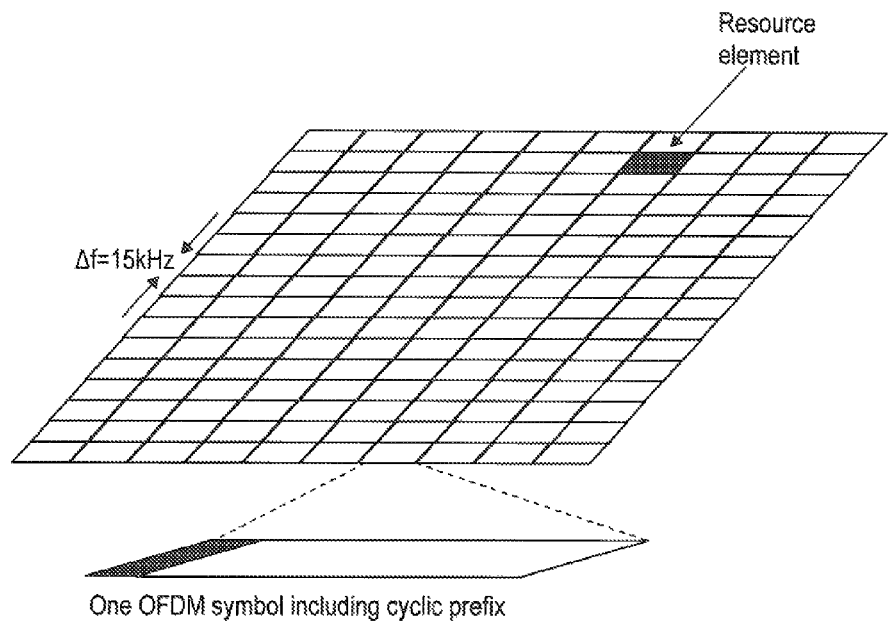
FIG. 1a illustrates a basic LTE downlink physical resource in terms of a time-frequency grid.
Figure 1B:
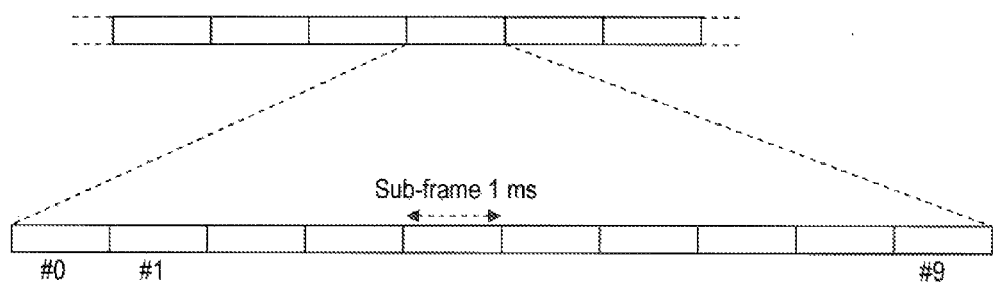
FIG. 1b illustrates LTE downlink transmissions organised into radio frames of 10 ms, each radio frame consisting of ten equally-sized subframes.
Figure 1C:
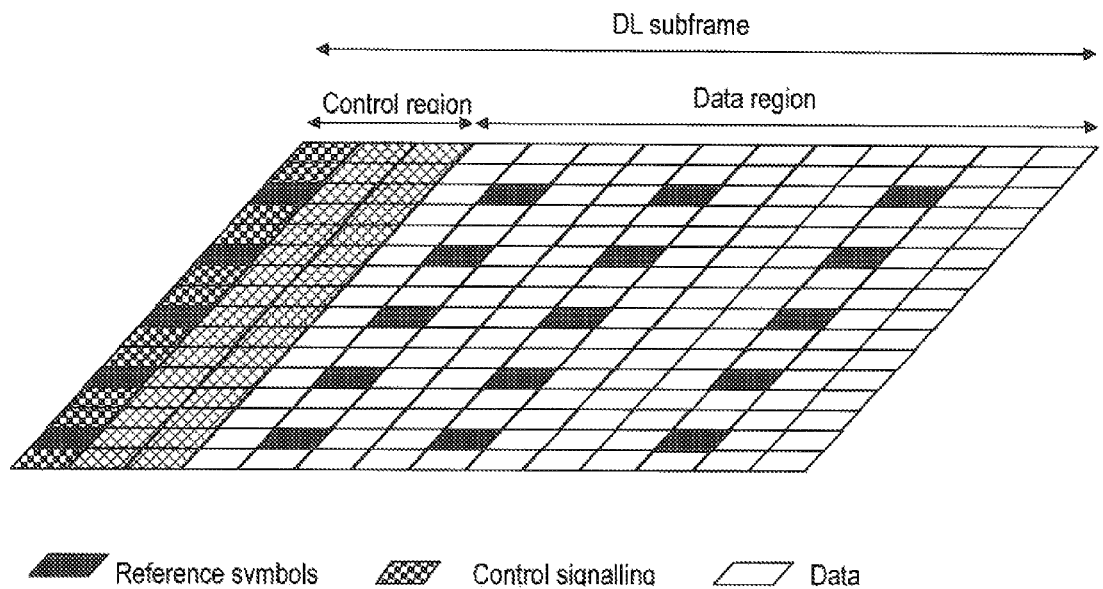
FIG. 1c illustrates a downlink subframe wherein the three first OFDM symbols are reserved for control signalling.

Briefly described, a UE and a method performed by the UE for power control of uplink transmissions, when the UE is being connected in dual connectivity mode to at least a first network node and a second network node are provided. The UE considers both the transmission power needed for transmission to the first network node and the transmission power needed for transmission to the second network node when the UE allocates transmission powers to uplink transmissions.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e. any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudo-code, and the like represent various processes which may be substantially represented in computer readable medium and so executed by a computer or processor, whether or not such computer or processor is explicitly shown.

The functions of the various elements including functional blocks, including but not limited to those labelled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analogue) circuitry including but not limited to application specific integrated circuit(s) [ASIC], and/or Field Programmable Gate Array(s), FPGA(s), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

The following terminologies may be used in the disclosure for consistency and simplicity. The technology described herein may apply to a heterogeneous networks comprising macro RBSs together with LPNs, and also to homogeneous networks comprising RBSs of similar or the same transmission power.

As used herein, the term "node" and/or "network node" may encompass nodes using any technology including, e.g., High Speed Packet Access, HSPA, LTE, CDMA2000, GSM, etc. or a mixture of technologies such as with a multi-standard radio (MSR) node (e.g. LTE/HSPA, GSM/HS/LTE, CDMA2000/LTE etc.). Furthermore the technology described herein may apply to different types of nodes e.g., base station, eNode B, Node B, relay, Base Transceiver Station, BTS, donor node serving a relay node (e.g., donor base station, donor Node B, donor eNB), supporting one or more radio access technologies.

Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Embodiments of a method performed by the UE for power control of uplink transmissions, when the UE being connected in dual connectivity mode to at least a first network node and a second network node will now be described with reference to FIG. 2a.

Figure 2A:
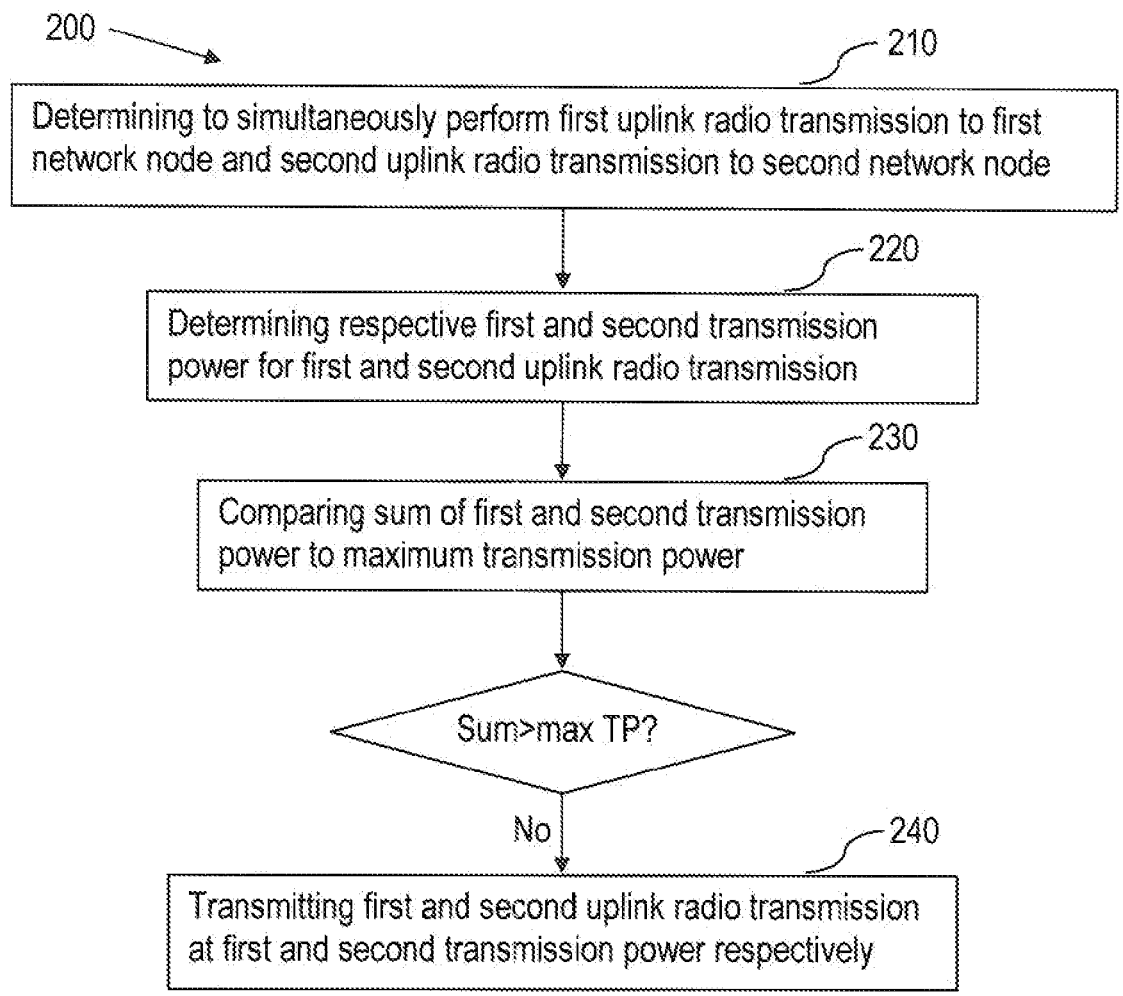
FIG. 2a is a flowchart of a method performed by a UE for power control of uplink transmissions, the UE being connected in dual connectivity mode according to an exemplifying embodiment.

FIG. 2a illustrates the method 200 comprising determining 210 to perform a first uplink transmission to the first network node and a second uplink transmission to the second network node, the uplink transmissions to be performed simultaneously. The method also comprises determining 220 a respective first and second uplink transmission power for the first and the second uplink transmission; and transmitting 240 the first and the second uplink transmissions at the first and the second uplink transmission power respectively when the sum of the first and second uplink transmission power is below a maximum transmission power.

When the UE is in dual connectivity mode, the UE may for example receive data and control signalling from the first network node and receive only control signalling from the second network node. The UE may also send control signalling to both the first and the second network node but send data in uplink only to the second network node. Alternatively, the UE may receive both data and control signalling from both network nodes and transmit both data and control signalling to both network nodes.

When the UE determines to perform a first uplink transmission to the first network node and a second uplink transmission to the second network node, the transmissions to be performed simultaneously, the UE determines a first and a second uplink transmission power required for the first and the second uplink transmission respectively. One example of how to determine the first and the second uplink transmission power is to calculate a power control loop according to Expression (1) twice, once for the first uplink transmission to the first network node and once for the second uplink transmission to the second network node. Another example is receiving control information from the first network node and/or the second network node indicating a required respective transmission power. The first and second uplink transmission power may be determined by open-loop or closed-loop calculations. In short, there may be several different ways to determine the first and the second uplink transmission power for the first and the second uplink transmission.

Once the UE has determined the first and the second uplink transmission power, the UE sums the two transmission power together. The UE compares the sum of the first uplink transmission power and the second uplink transmission power to a maximum transmission power, for example 23 dBm. If the sum of the first uplink transmission power and the second uplink transmission power does not exceed the maximum transmission power, then the UE may transmit the first uplink transmission to the first network node at the first uplink transmission power and simultaneously transmit the second uplink transmission to the second network node at the second uplink transmission power.

It shall further be pointed out that the UE may be connected to three or more network nodes, but for simplicity, only a scenario of the UE being connected to two network nodes are described herein.

The method performed by the UE may have several advantages. One possible advantage is that the method allows a power limited UE to control and share its transmission power between simultaneous transmissions on the same carrier, and also on separate carriers.

Figure 2B:
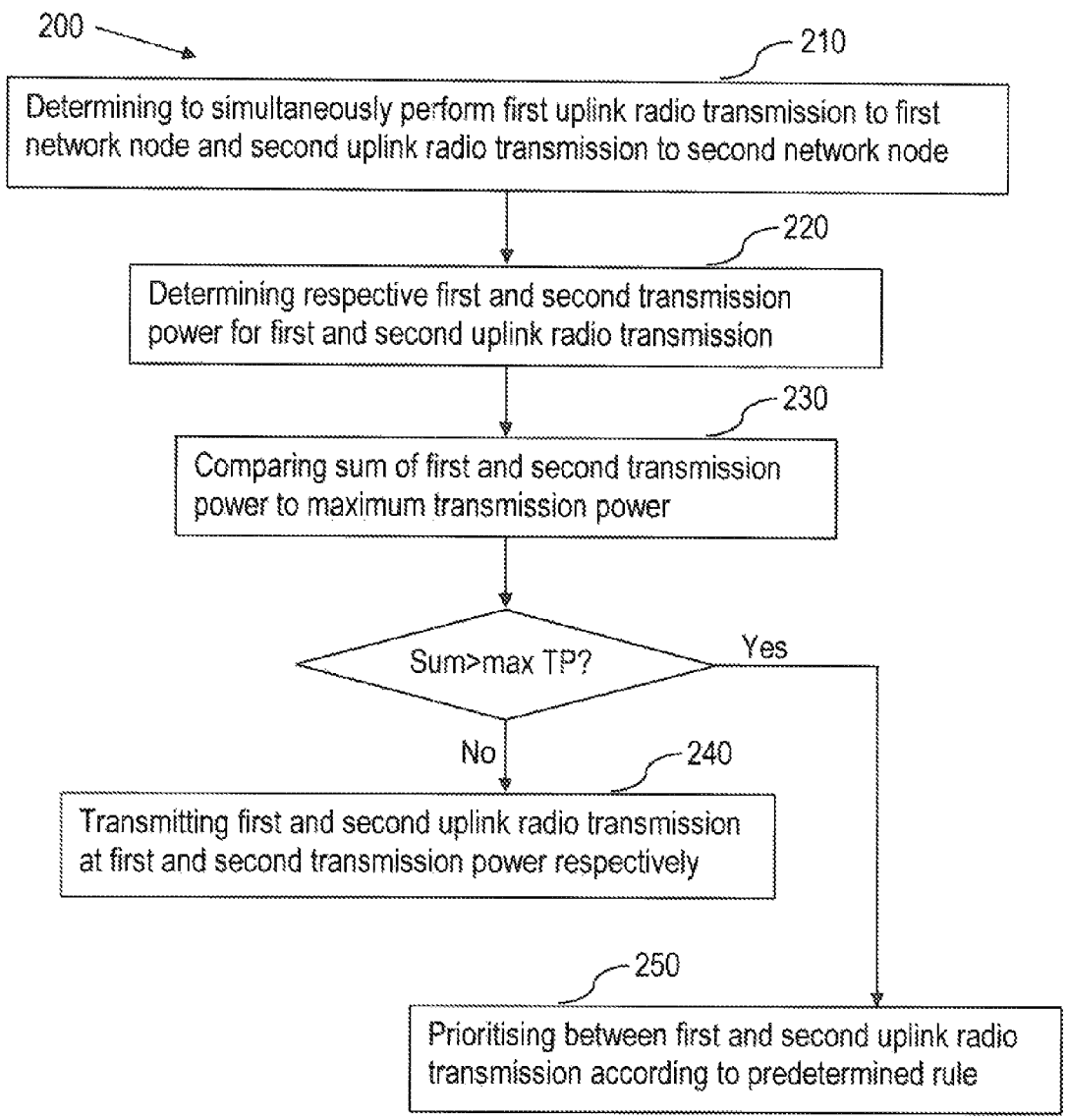
FIG. 2b is a flowchart of a method performed by a UE for power control of uplink transmissions, the UE being connected in dual connectivity mode according to still an exemplifying embodiment.

If the sum of the first and the second uplink transmission power exceeds the maximum transmission power, the method may comprise prioritising 250 between the first and the second uplink transmission according to a predetermined rule, as illustrated in FIG. 2b.

If the sum of the first and the second uplink transmission power exceeds the maximum transmission power, the UE cannot transmit the first uplink transmission to the first network node at the first uplink transmission power and simultaneously transmit the second uplink transmission to the second network node at the second uplink transmission power. Hence, the UE may be forced to perform some sort of prioritisation between the first uplink transmission and the second uplink transmission. There may be a plurality of different prioritisations that the UE can perform according to the predetermined rule as will be described in more detail below.

In an example, the predetermined rule indicates to the UE to prioritise the first or the second uplink transmission based on a link quality between the UE and the first and the second network node respectively.

There may be a big difference in link quality between the UE and the first and the second network node. The UE may for example be located relatively close to one of the network nodes and relatively far from the other. There may further be relatively many UEs being connected to one of the network nodes causing a relatively high level of interference and relatively few UEs being connected to the other network node causing a relatively low level of interference. These factors may substantially affect the link quality between the UE and the first and the second network node. Hence, there may be a relatively big difference in the link quality between the UE and one of the network nodes and the link quality between the UE and the other network node. If this is the case, the UE may for example prioritise the transmission to the network node to which it has the best link quality in order to try to guarantee that the transmission to that network node will be received successfully. By prioritising the transmission to the network node to which it has the best link quality, the UE may transmit the transmission to that network node at the determined required transmission power, e.g. as determined using Expression (1). Then the UE may e.g. either refrain from transmitting the other transmission to the other network node in order to save battery since the other transmission to the network node to which the UE has the worst link quality may perhaps not be received successfully due to the bad link quality. However, the UE may also choose to transmit the other transmission to the network node to which the UE has the worst link quality at a transmission power corresponding to the maximum transmission power minus the transmission power required for the transmission to the network node to which it has the best link quality.

However, the UE may in another example prioritise the network node to which it has the worst link quality in order to try to guarantee that the transmission to that network node will be received successfully, and hope that the transmission to the network node to which the UE has the best link quality may still be received successfully even if the transmission power for that transmission is reduced. In such a scenario, the UE may e.g. transmit the transmission to the network node to which it has the worst link quality at the determined required transmission power, e.g. as determined using Expression (1). The UE may then e.g. transmit the other transmission to the network node to which the UE has the best link quality at a transmission power corresponding to the maximum transmission power minus the transmission power required for the transmission to the network node to which it has the worst link quality.

According to an embodiment, the first uplink transmission comprises control information and the second uplink transmission comprises data, wherein the predetermined rule indicates to the UE to prioritise the uplink transmission comprising control information by transmitting the first uplink transmission at the first uplink transmission power.

As described above, the UE may e.g. receive data and control signalling from the first network node and receive only control signalling from the second network node. The UE may also send control signalling to both the first and the second network node but send data in uplink only to the second network node. Alternatively, the UE may receive both data and control signalling from both network nodes and transmit both data and control signalling to both network nodes.

In this example, the UE wants to transmit a first uplink transmission to the first network node simultaneously as the UE transmits a second uplink transmission to the second network node. Further in this example, the first uplink transmission to the first network node comprises control information and the second uplink transmission to the second network node comprises data. The predetermined rule then tells the UE to prioritise the uplink transmission comprising control information by transmitting the first uplink transmission at the first uplink transmission power. If the second uplink transmission comprising data is not received successfully, the second network node is enabled to inform the UE that the data was not successfully received, e.g. via HARQ ACK/NACK procedure. In case the first network node does not successfully receive control information, the connection between the first network node and the UE may be lost in the worst case. The UE may thus transmit the first uplink transmission comprising control information at the first uplink transmission power The UE may then transmit the second uplink transmission at a transmission power of the maximum transmission power minus the first uplink transmission power.

Since the UE has a maximum transmission power, the transmission power left for the second uplink transmission comprising data is the maximum transmission power minus the first uplink transmission power.

The UE may alternatively refrain from transmitting the second uplink transmission if the transmission power of the maximum transmission power minus the first uplink transmission power is below a first predefined threshold.

There may be relatively little transmit power left for the second uplink transmission. Merely as an example, assume the first uplink transmission was transmitted at 80% of the maximum transmission power, then there is only 20% of the maximum transmission power left for the second uplink transmission.

The threshold may be defined in a plurality of different ways. It may be received by the UE from one of the first network node or the second network node. There may be one threshold for the first network node and one threshold for the second network node. There may again be one threshold for transmission of data and one threshold for transmission of control information.

The threshold may be defined as a percentage of the maximum transmission power or it may be defined as a percentage of the required transmission power. As described above, the required transmission power may be determined by calculating a power control loop according to Expression (1) twice, once for the first uplink transmission to the first network node and once for the second uplink transmission to the second network node. Another example is receiving control information from the first network node and/or the second network node indicating a required respective transmission power.

According to an embodiment, the predetermined rule indicates to the UE to scale at least the first uplink transmission power based on a first scaling factor and then transmitting the first and the second uplink transmission at the scaled transmission power.

In case the sum of the first and second uplink transmission power exceeds the maximum transmission power, then the UE is not able to transmit both the first and the second uplink transmission at the respective first and second uplink transmission power. The predetermined rule may then indicate to the UE to scale e.g. the first uplink transmission power based on a first scaling factor. This means that the first uplink transmission power is reduced and hence the sum of the first and second uplink transmission power may possibly no longer exceed the maximum transmission power. If so, the UE may transmit the first uplink transmission at the scaled first uplink transmission power and the second uplink transmission at the determined second uplink transmission power.

However, the UE may scale both the first and the second transmission power based on the first scaling power in order to reduce the sum of the first and second uplink transmission power so that the sum possibly no longer exceeds the maximum transmission power.

It shall also be pointed out that all the above embodiments and examples are not exclusive, meaning that they can be arbitrarily combined. Merely as an example, the first scaling factor may indicate to the UE to scale the uplink transmission power for the transmission comprising data and not to scale the uplink transmission power for the transmission comprising control information.

The predetermined rule may indicate to the UE to scale the second uplink transmission power based on a second scaling factor and then transmitting the first uplink transmission at the scaled first uplink transmission power and transmitting the second uplink transmission at the scaled second uplink transmission power.

There may be two or more scaling factors for the first and the second uplink transmission. For example, there may be one scaling factor for the first uplink transmission power. Then, if the sum of the first and second uplink transmission power exceeds the maximum transmission power, then the UE reduces the first uplink transmission power based on the first scaling factor and reduces the second uplink transmission power based on the second scaling factor. Then, if the sum of the first and second uplink transmission power no longer exceeds the maximum transmission power, the UE may transmit the first uplink transmission at the scaled first uplink transmission power and transmit the second uplink transmission at the scaled second uplink transmission power.

The scaling factors may be associated with the first and the second network node respectively and signalled to the UE as the UE becomes connected to or associated with the first and the second network node. The first and the second scaling factors may be associated with the type of the first and the second network node respectively so that a macro network node is always associated with e.g. the first scaling factor and a low power network node is always associated with e.g. the second scaling factor. Still further, the first scaling factor may e.g. be associated with uplink transmissions comprising control information and the second scaling factor may e.g. be associated with uplink transmissions comprising data. Still further, there may be one scaling factor for uplink transmissions of data to the first network node, another scaling factor for uplink transmissions of control information to the first network node, yet another scaling factor for uplink transmissions of data to the second network node, and still another scaling factor for uplink transmissions of control information to the second network node.

According to an embodiment, the method further comprises receiving, from the first and the second network node, a respective first and second maximum tolerance value indicating a respective maximum difference between an expected transmission power and an actual transmission power.

The first and the second network node may indicate to the UE an expected transmission power. In an example, this corresponds to the UE determining 120 the respective first and second uplink transmission power for the first and the second uplink transmission. In another example, the UE may determine the respective first and second uplink transmission power for the first and the second uplink transmission e.g. by means of Expression (1) as described above. In either case, the UE receives a respective first and second maximum tolerance value from the first and the second network node respectively. These values indicate to the UE how much the UE may deviate from an expected first and an expected second uplink transmission power. In other words, the values indicates how much the UE may reduce the first and the second uplink transmission power in relation to an expected first and second uplink transmission power.

The first and second maximum tolerance value may be e.g. a percentage of the expected first and second uplink transmission power. Merely as an example, the first and second maximum tolerance value is 15% and 25% respectively, meaning that the UE may reduce the first uplink transmission power with maximum 15% of the expected first uplink transmission power and reduce the second unlink transmission power with maximum 25% of the expected second uplink transmission power.

According to yet an embodiment, the method further comprises determining if the first and the second uplink transmission can be performed without exceeding the first or second maximum tolerance value and the maximum transmission power, and if not, transmitting the transmission having the highest priority at a transmission power indicated by the maximum tolerance value for that transmission.

It might be that the sum of the first and second uplink transmission power still exceeds the maximum transmission power even after scaling the first and the second uplink transmission power. In such a case, the UE may look at a first priority associated with the first uplink transmission and a second priority associated with the second uplink transmission. The UE may then transmit the transmission having the highest priority at the transmission power indicated by the maximum tolerance value for that transmission, meaning that the UE transmits that uplink transmission at a transmission power corresponding to the expected transmission power reduced by the maximum tolerance value for that transmission. The UE may then either refrain from transmitting the other uplink transmission or transmit the other uplink transmission at a transmission power corresponding to the maximum transmission power minus the transmission power of the uplink transmission having the highest priority.

The predetermined rule may further indicate to the UE to adapt modulation and/or coding of at least one of the first and the second uplink transmission due to reduced uplink transmission power, the method further comprising the UE signalling to the first and/or second network node the modulation and/or coding to be used and transmitting the first and/or the second uplink transmissions at the adapted modulation and/or coding.

In case the first uplink transmission power and the second uplink transmission power exceeds the maximum transmission power, the UE may adapt modulation and/or coding of at least one of the first and the second uplink transmission. However, the first and the second network node may be expecting a certain modulation and/or coding of at least one of the first and the second uplink transmission respectively. Thus, the UE signals to the first and/or second network node informing it/them about the modulation and/or coding to be used and transmitting the first and/or the second uplink transmissions.

If an uplink transmission is transmitted with reduced uplink transmission power, then a lower modulation level and/or coding rate may enable a receiver to successfully receive the uplink transmission. The reduced uplink transmission power may possibly result in a higher bit error rate at the receiver. Thus, a lower modulation level and/or coding rate may enable the receiver to successfully receive the uplink transmission by error correction.

The method may further comprise calculating a Power Headroom Reporting, PHR, based on whether simultaneous transmission of the first uplink transmission to the first network node and the second uplink transmission to the second network node is required or not.

Power headroom indicates how much transmission power left for the UE to use in addition to the power being used by a current transmission. Power headroom may be described by Expression (2):

$$\text{Power Headroom} = \text{UE Max Transmission Power} - \text{PUSCH Power} = P\text{max} - P\_\text{pusch} \quad (2)$$

If the Power Headroom value is positive (+), it indicates that the UE still has some space under the maximum power, implying that the UE may transmit more data if allowed. If the Power Headroom value is negative (−), the Power Headroom value indicates that the UE is already transmitting at a power greater than what the UE is allowed to transmit.

The method 200 may further comprise calculating a first PHR for the first uplink transmission to the first network node and a second PHR for the second uplink transmission to the second network node and reporting the first PHR to the first network node and the second PHR to the second network node.

When the UE calculates the PHR for one network node, the UE may assume no PUCCH/PUSCH transmission for other network node. The UE has already determined whether the sum of the first and second uplink transmission power exceeds the maximum transmission power or not. Hence the UE calculates the PHR for the first uplink transmission and the PHR for the second uplink transmission separately.

Alternatively, the method may further comprise calculating one PHR for both the first uplink transmission and the second uplink transmission and reporting the one calculated PHR to both the first network node and the second network node.

The UE in this case calculates one PHR for both the first uplink transmission and the second uplink transmission. When the UE calculates the PHR, one PHR calculation takes into account all the PUCCH/PUSCH transmission in the same sub-frame, and other PHR calculation(s) may only consider the PUCCH/PUSCH transmission for the envisioned network node. This will indicate how much uplink transmission power is left for the UE to use in addition to the uplink transmission power being used by the first and the second uplink transmission. The UE may then report the PHR to both the first network node and the second network node, thereby informing both of them if there is any uplink transmission power left or not, and if there is transmission power left, the PHR indicates how much. The first and the second network node may then possibly adapt any grant for a subsequent uplink transmission based on the received PHR. Merely as an example, in case the PHR indicates that the UE is transmitting at, or close to, the maximum transmission power, one of the network nodes may grant less uplink data transmission to itself in order to lower the power consumption of the UE and ascertain that control information may be transmitted from the UE at a required transmission power.

Embodiments herein also relate to a UE adapted for power control of uplink transmissions, the UE being connected in dual connectivity mode. The UE has the same technical features, objects and advantages as the method performed by the UE. The UE will only be described in brief in order to avoid unnecessary repetition.

Figure 3:
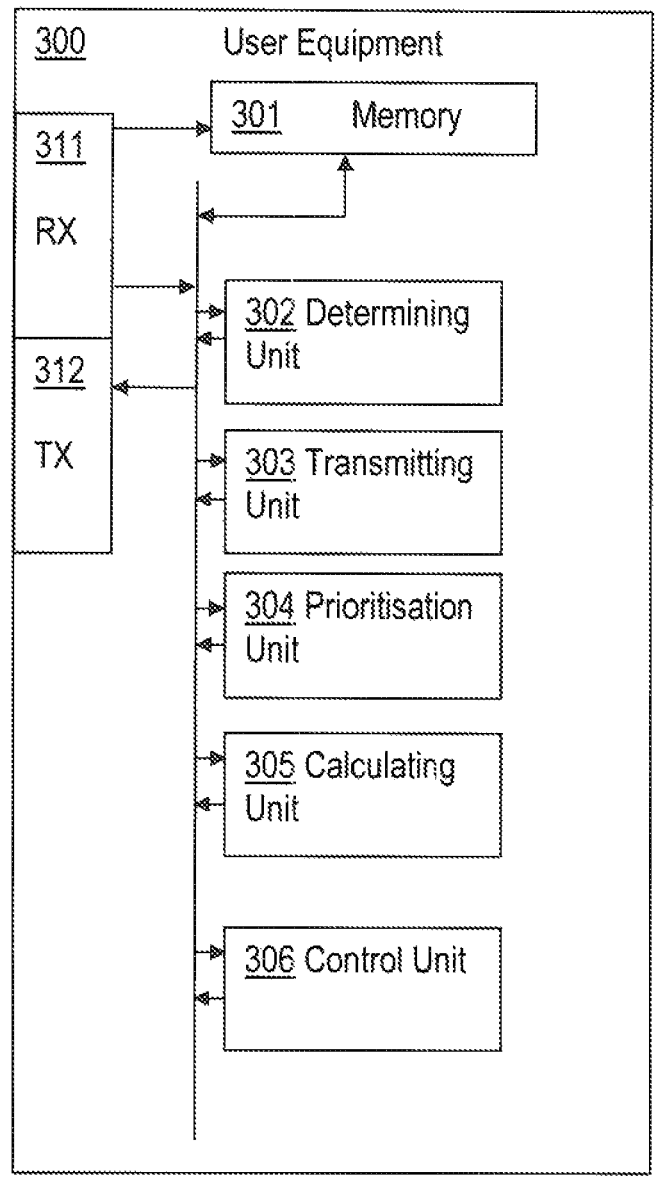
FIG. 3 is a block diagram of a UE adapted for power control of uplink transmissions, the UE being connected in dual connectivity mode according to an exemplifying embodiment.

FIG. 3 is a block diagram of a UE adapted for power control of uplink transmissions, the UE being connected in dual connectivity mode, according to an exemplifying embodiment.

FIG. 3 illustrates the UE 300 comprising a determining unit 302 adapted for determining to perform a first uplink transmission to the first network node and a second uplink transmission to the second network node, the uplink transmissions to be performed simultaneously, and for determining a respective first and second uplink transmission power for the first and the second uplink transmission. The UE 300 also comprises a transmitting unit 303 adapted for transmitting the first and the second uplink transmissions at the first and the second uplink transmission power respectively when the sum of the first and second uplink transmission power is below a maximum transmission power.

The UE has the same possible advantages as the method performed by the UE. One possible advantage is that a power limited UE may be enabled to control and share its transmission power between simultaneous transmissions on the same carrier, and also on separate carriers.

The UE 300 may further comprise a prioritisation unit 304, wherein if the sum of the first and the second uplink transmission power exceeds the maximum transmission power, the prioritising unit 304 is adapted to prioritise between the first and the second uplink transmission according to a predetermined rule.

The predetermined rule may indicate to the UE to prioritise the first or the second uplink transmission based on a link quality between the UE and the first and the second network node respectively.

According to an embodiment, the first uplink transmission comprises control information and the second uplink transmission comprises data, wherein the predetermined rule indicates to the UE to prioritise the uplink transmission comprising control information by transmitting the first uplink transmission at the first uplink transmission power.

The transmitting unit 303 may further be adapted for transmitting the second uplink transmission at a transmission power of the maximum transmission power minus the first uplink transmission power.

The transmitting unit 303 may further be adapted for refraining from transmitting the second uplink transmission if the transmission power of the maximum transmission power minus the first uplink transmission power is below a first predefined threshold.

The predetermined rule may indicate to the UE to scale at least the first uplink transmission power based on a first scaling factor and then transmitting the first and the second uplink transmission at the scaled transmission power.

The predetermined rule may indicate to the UE to scale the second uplink transmission power based on a second scaling factor, wherein the transmitting unit 303 is adapted for transmitting the first uplink transmission at the scaled first uplink transmission power and transmitting the second uplink transmission at the scaled second uplink transmission power.

The UE 300 may further comprise a receiving unit 205 adapted for receiving, from the first and the second network node, a respective first and second maximum tolerance value indicating a respective maximum difference between an expected transmission power and an actual transmission power.

The determining unit 302 may further be adapted for determining if the first and the second uplink transmission can be performed without exceeding the first or second maximum tolerance value and the maximum transmission power, and if not, the transmitting unit 303 is adapted for transmitting the transmission having the highest priority at a transmission power indicated by the maximum tolerance value for that transmission.

The predetermined rule may indicate to the UE to adapt modulation and/or coding of at least one of the first and the second uplink transmission due to reduced uplink transmission power, wherein the transmitting unit 303 further is adapted for signalling to the first and/or second network node the modulation and/or coding to be used and transmitting the first and/or the second uplink transmissions at the adapted modulation and/or coding.

The UE 300 may further comprise a calculating unit 305 adapted for calculating a PHR based on whether simultaneous transmission of the first uplink transmission to the first network node and the second uplink transmission to the second network node is required or not.

The calculating unit 305 further is adapted for calculating a first PHR for the first uplink transmission to the first network node and a second PHR for the second uplink transmission to the second network node and the transmitting unit 303 is adapted for reporting the first PHR to the first network node and the second PHR to the second network node.

The calculating unit 305 further is adapted for calculating one PHR for both the first uplink transmission and the second uplink transmission and transmitting unit 303 is adapted for reporting the one calculated PHR to both the first network node and the second network node.

Figure 4A:
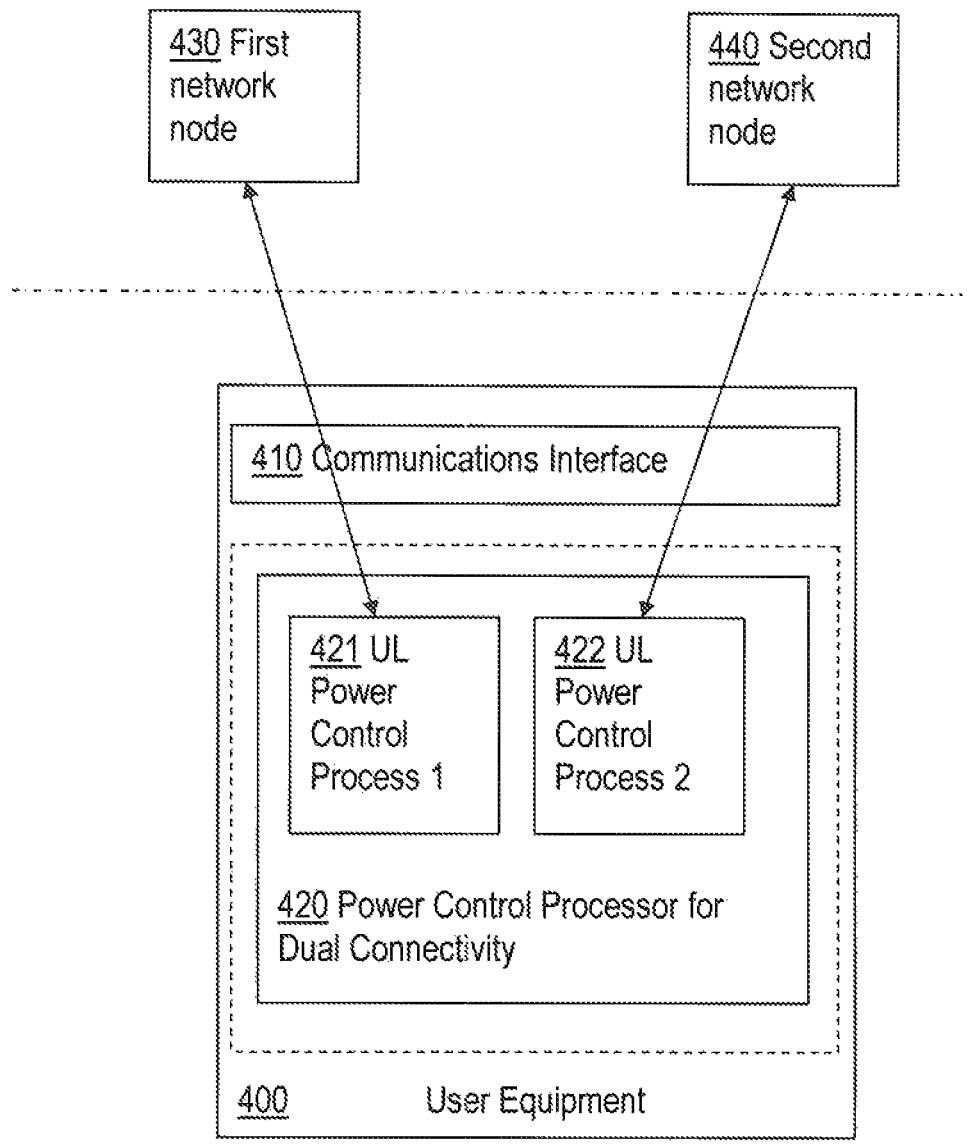
FIG. 4a is a block diagram of a UE adapted for power control of uplink transmissions, the UE being connected in dual connectivity mode according to an exemplifying embodiment.

FIG. 4*a* is a block diagram of a UE 400 adapted for power control of uplink transmissions, the UE being connected in dual connectivity mode according to an exemplifying embodiment.

FIG. 4*a* illustrates portions of an example telecommunications network, and particularly two network nodes, e.g., the first network node 430 and the second network node 440. The first network node and second network node may or may not be members of a same radio access network. In an LTE context, the first network node and the second network node may be base station nodes. In other contexts or other types of RANs, the first network node and the second network node may be a base station node or other type of node, such as an RNC node, for example.

FIG. 4*a* further also shows a UE 400 which communicates over a radio or air interface (indicated by the dotted-dashed line) with the two network nodes 430 and 440. The UE 400 comprises a communications interface 410 configured to facilitate communications over the radio interface between the UE and the network nodes, including dual connectivity wireless communications utilising a radio frame structure. In the dual connectivity wireless communications transmissions occur essentially concurrently between the UE and the plural network nodes.

Figure 1D:
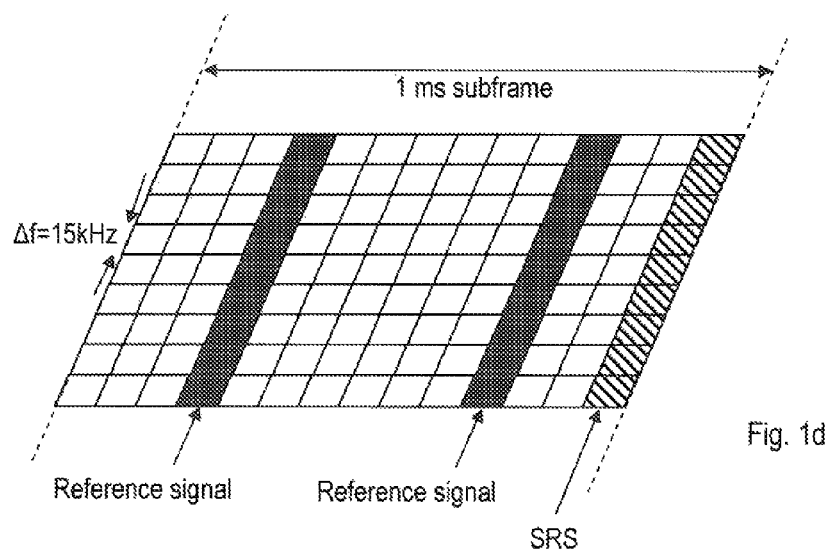
FIG. 1d illustrates an example uplink transmission subframe.
Figure 1E:
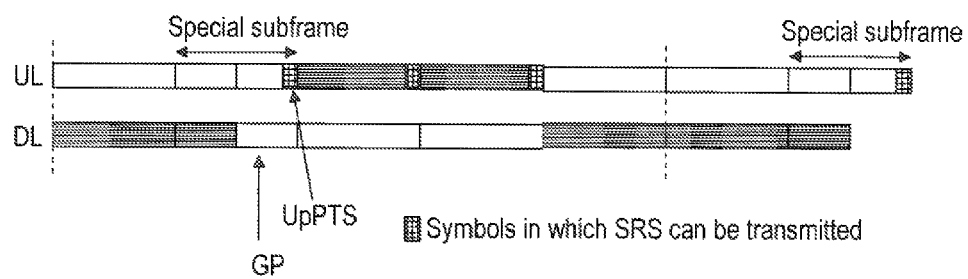
FIG. 1e shows an example 10 ms radio frame for TDD, wherein in each of the two 5-slot subframes the ratio of DL slots to UL slots is 3DL:2UL, and wherein up to eight symbols may be set aside for sounding reference signals.
Figure 1F:
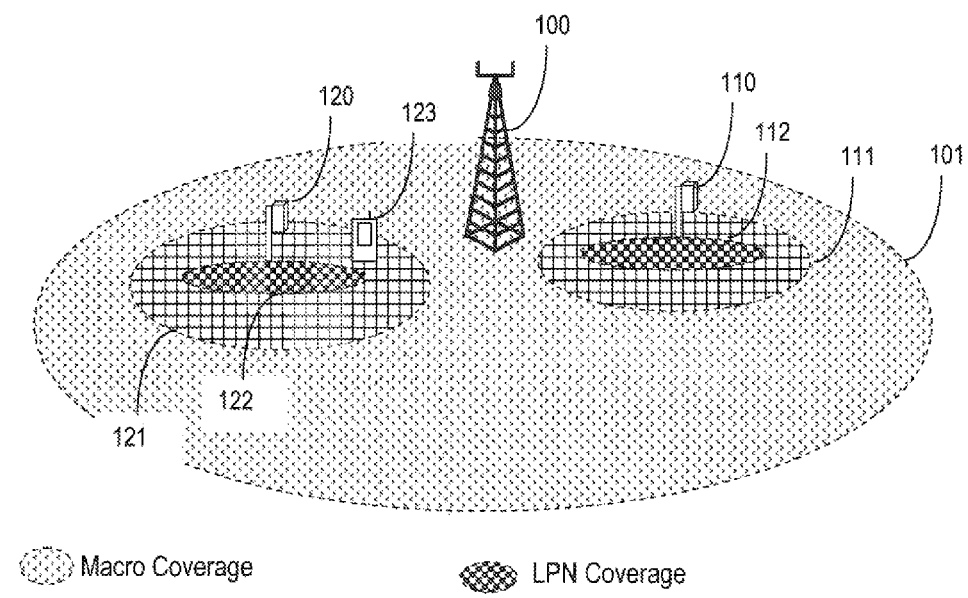
FIG. 1f illustrates a dual connectivity scenario wherein a wireless terminal participates both in a connection with a macro RBS node and an LPN node.
Figure 1G:
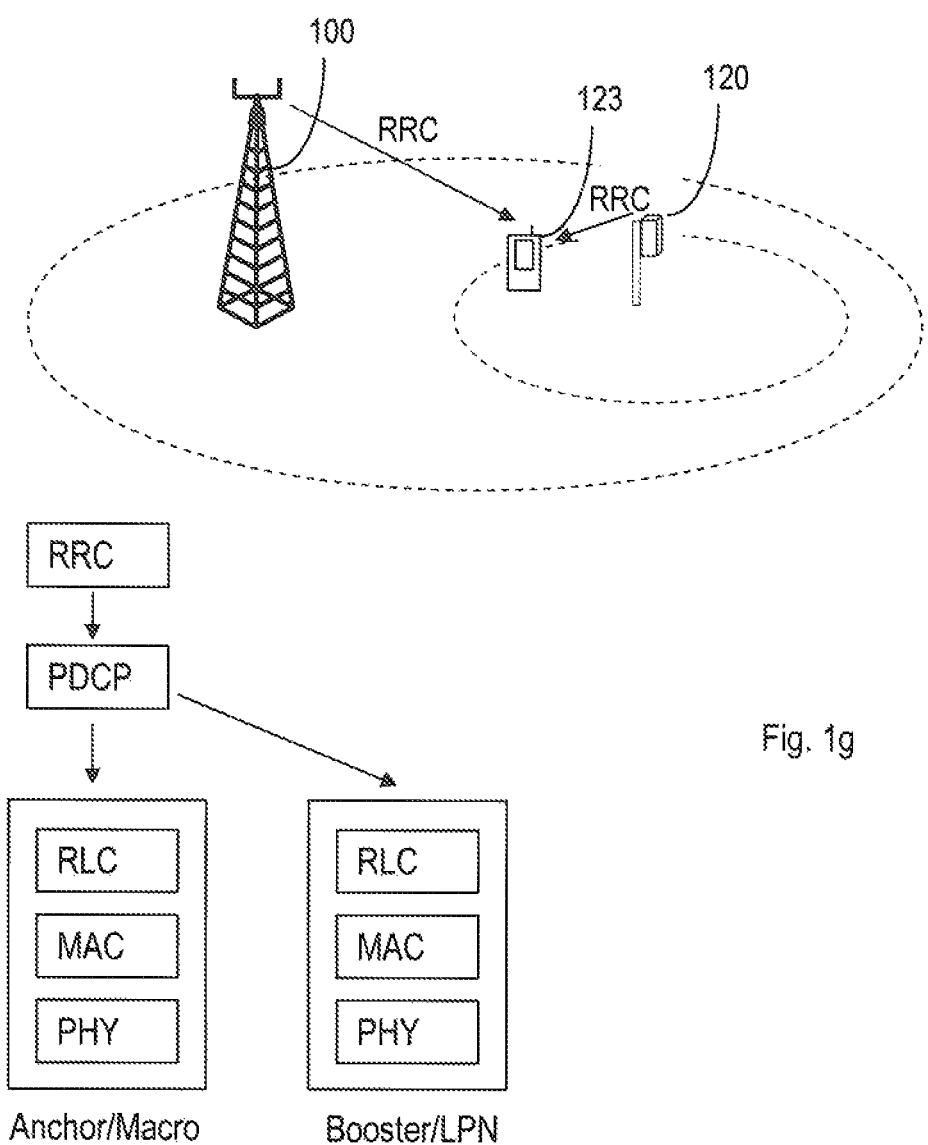
FIG. 1g illustrates a macro RBS and an LPN, wherein duplicate PHY/MAC/RLC instances are required on the UE side.
Figure 1H:
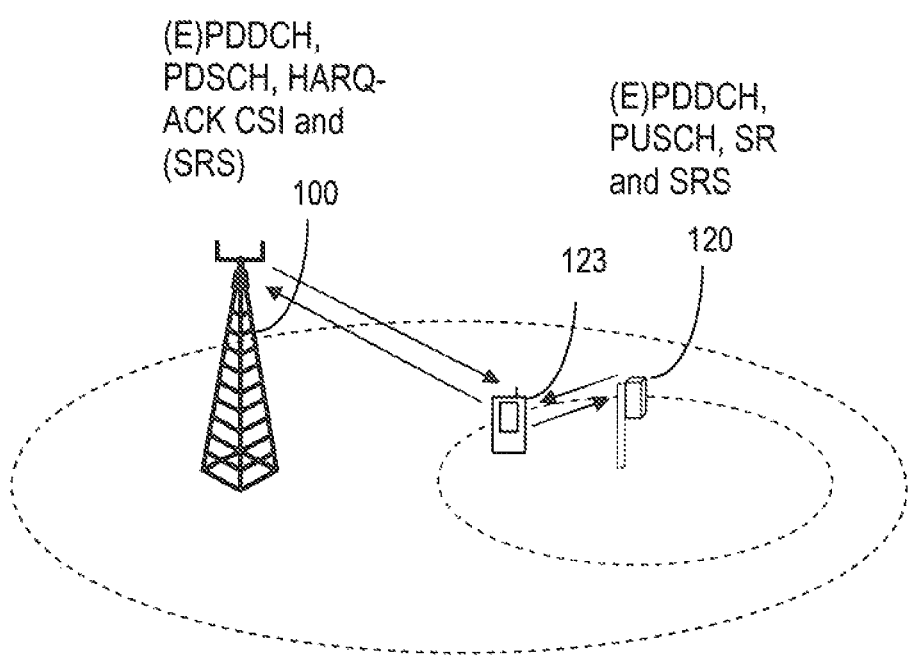
FIG. 1h illustrates a UE operating in a heterogeneous network with a macro cell and LPNs, wherein there is a relatively large difference in transmission power.

The UE also comprises a processor 420, also known as a power control processor. The power control processor 420 is configured to handle both uplink (UL) and downlink (DL) transmissions which are scheduled in the radio frame structure. For uplink (UL) purposes the radio frame structure may be described, at least in part, with reference to FIG. 1*d* and/or FIG. 1*e*. As such the organisation of the frame structure may be specified by one or more network nodes and expressed in one or more control channels of the radio frame, as previously explained. In accordance with such frame organisation the UE receives signals and data in downlink (DL) transmissions of the frame structure and transmits appropriate signals and data in uplink (UL) transmissions of the frame structure, and does so for both network nodes when participating in dual connectivity operations.

The power control processor is configured to execute plural uplink (UL) power control loops or processes when engaging in the dual connectivity wireless communications. In other words, the dual connected UE of FIG. 4*a* runs at least two different power control loops at the same time. A first power control loop 421 corresponds to one node (e.g., the first network node of FIG. 4*a*), while a second power control loop 422 corresponds to another node (e.g., the second network node of FIG. 4*a*). In essence, the UE performs two different processes related to the UL transmission power control method as shown in Expression (1).

Figure 4B:
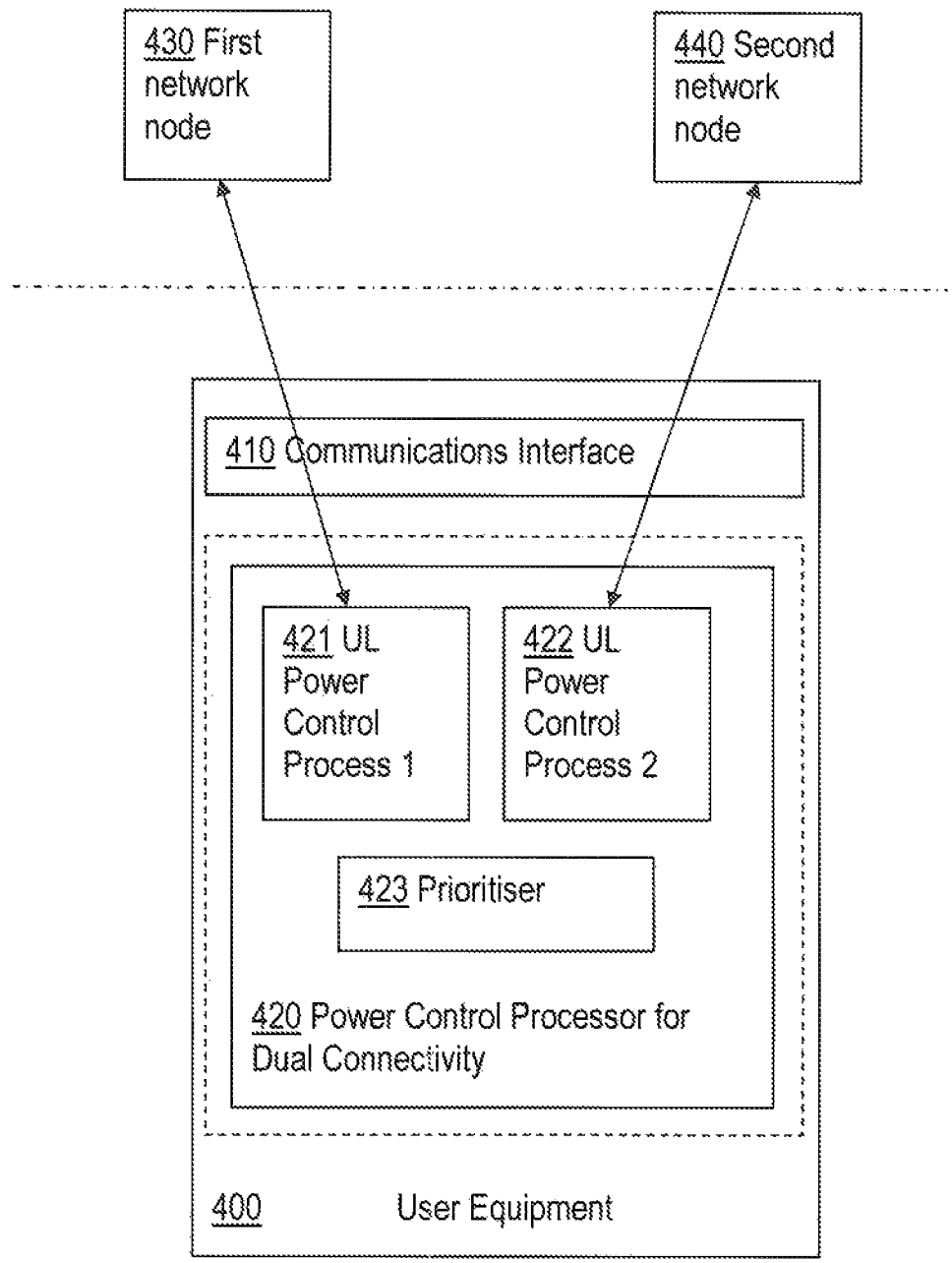
FIG. 4b is a block diagram of a UE adapted for power control of uplink transmissions, the UE being connected in dual connectivity mode according to yet an exemplifying embodiment.

Thus, as shown in FIG. 4*a*, the UE 400 may have to transmit to more than one eNodeB/node. In at least some examples, the power control processor 420 may be configured to prioritise execution of the two UL power control processes or loops 421 and 422, and as such may comprise a prioritiser function 423 or unit as shown in FIG. 4*b*. The prioritiser 423 may implement a prioritisation routine configured to allocate the UL power between the two nodes. For instance if the UE has control information to transmit to the first network node and data to transmit to the second network node, the prioritiser 423 may prioritise the control information transmission and allocate the required power to the first network node while the remaining power is used for data transmission to the second network node. This prioritisation scheme is reasonable as the second node can benefit from HARQ feedback.

In decoupled DL/UL transmission the UL transmissions from the UE are always done to one eNodeB/node while DL transmissions are associated with another eNodeB/node. Execution of plural UL power control processes may be desirable even in the case when the DL and UL transmissions are decoupled. For instance, a UE upon receiving a DL transmission from one node still needs to transmit UL control information to this DL associated node (e.g. HARQ feedback, etc.). The same applies when the eNodeB/node associated with UL transmissions from the UE transmits DL control information to this UE (e.g. HARQ feedback, etc.). As a result, even in the case of decoupled DL and UL, the UE will still need to simultaneously transmit to different nodes/eNodeBs. The need for the simultaneous transmissions may become even more pronounced when certain transmissions are requested. For example, a point (e.g. eNodeB) associated with DL data transmissions may request an aperiodic CSI and HARQ feedback at the same time as a PUSCH transmission to the UL point (e.g. eNodeB).

In another example the UE is configured (or it is part of a standard) a prioritisation order between a plurality of transmissions and each transmission is categorised by the particular node and/or the carried information (e.g., L1 control or data). An idea is to prioritise transmissions based on the information category, e.g. control information like HARQ feedback should have higher priority over normal data transmissions. Some example rules are given below.

In an example implementation of prioritisation, a plurality of transmissions from a UE may include L1 control transmissions to a first node (e.g., the first network node): L1 control transmissions to a second node (e.g., the second network node); data to the first node; and, data to the second node. According to an example prioritisation scheme, the priority order for these four different types of transmissions may be in the order in which they are listed above (the L1 control transmissions to the first node having the highest priority, the L1 control transmissions to a second node having the next highest priority, and so forth).

According to a further example, when there is insufficient power for all the transmissions (such as the example prioritised transmissions just described), the lowest priority transmissions may be dropped, until the remaining transmissions can be supported with the available transmission power budget. In an alternative embodiment, all transmissions (in order of priority) that fit in a transmission power budget are transmitted at an intended power (e.g., according to the separate power control loops). However, the transmissions that do not fit the power budget, known as the remaining transmissions, are (in order of priority) allocated a lower (than nominal) transmission power (e.g., the remaining Tx power budget). Transmissions with a further lower priority are not transmitted (i.e., transmitted at zero power). The benefit of this embodiment is that the full Tx power budget of the UE is utilized, and allocated to the most prioritised transmissions.

In an alternative example, the remaining Tx power budget is allocated to at least a first of the remaining transmissions that fits (at nominal Tx power, e.g., according to an associated power control loop) within the remaining Tx power budget. The benefit of this embodiment is that the UE power budget is effectively utilised and transmissions that can be transmitted at expected nominal Tx power are prioritised, which consequently can be expected to be decoded at an eNodeB at the intended probability of error (e.g., intended Block Error Rate, BLER).

In a further example, the control information to an anchor node may be prioritised if the total required power for the control information exceeds the maximum UE output power.

In another example, and based on the previous example, if the remaining power for PUSCH transmission falls below a certain pre-defined threshold, the power may be set to zero.

Figure 4C:
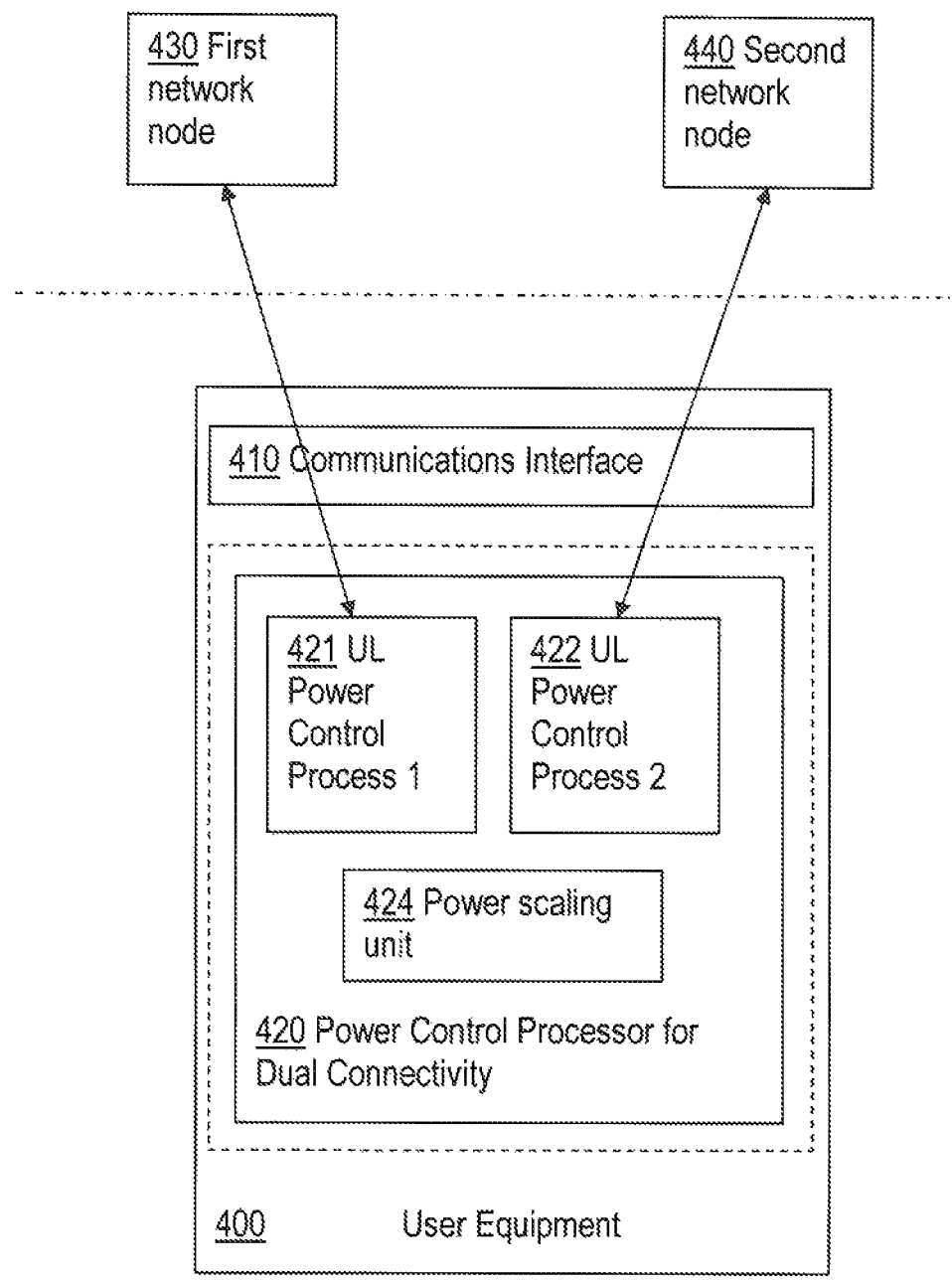
FIG. 4c is a block diagram of a UE adapted for power control of uplink transmissions, the UE being connected in dual connectivity mode according to another exemplifying embodiment.

In another example, illustrated by way of example in FIG. 4c, if the UE 400 is transmitting data (or L1 control) to the at least two nodes 430, 440 simultaneously and the total required power exceeds the maximum output power of the UE, the UE shall scale down the UL transmit power of the two, or more, transmissions so that the total transmit power does not exceed the maximum output power. To this end, the power control processor of FIG. 4c comprises a power scaling unit 424.

The scaling factor(s) for the plurality of transmissions as utilised by the scaling unit 424 may be the same without indication from the eNB or UE. Alternatively, in another further example, the ratio of the scaling factor(s) could be signalled to the UE 400 for use by the scaling unit 424. Such signalling may be, for example, higher layer signalling. As used herein, "higher layer signalling" includes any signalling that is out-of-band of the radio frame structure, e.g., that is transmitted or received outside of the radio frame structure. As such, "higher layer signalling" may include RRC signalling, for example.

Thus, in a generalised example represented by FIG. 4c, the UE 400 allocates power to a plurality of transmissions, each transmission associated with a particular node and/or information category (e.g., L1 control or data). Each of the plurality of transmissions may be further associated with a scaling factor. If the total transmit power budget is exceeded by the allocated transmissions, the Tx power of the respective transmissions are scaled down (backed off) according to the associated scaling factor, as to meet the available Tx power budget.

In another further example, if one of the UL transmit powers falls below a predefined threshold, the UE may set the transmit power to zero for this link and transmit with full power to the other node.

In another example, the power scaling of transmissions is not applied to high priority transmissions, but only to less prioritised transmissions. For example, L1 control transmissions may be allocated a nominal transmission power. The remaining Tx power budget may then be shared by less prioritised data transmissions in accordance with the associated scaling factors. This example has the advantage that important transmissions, such as L1 control, may be transmitted at full nominal Tx power and thereby not violate target probability of error for these channels, while allowing best effort data to utilize the remaining Tx power budget.

Figure 4D:
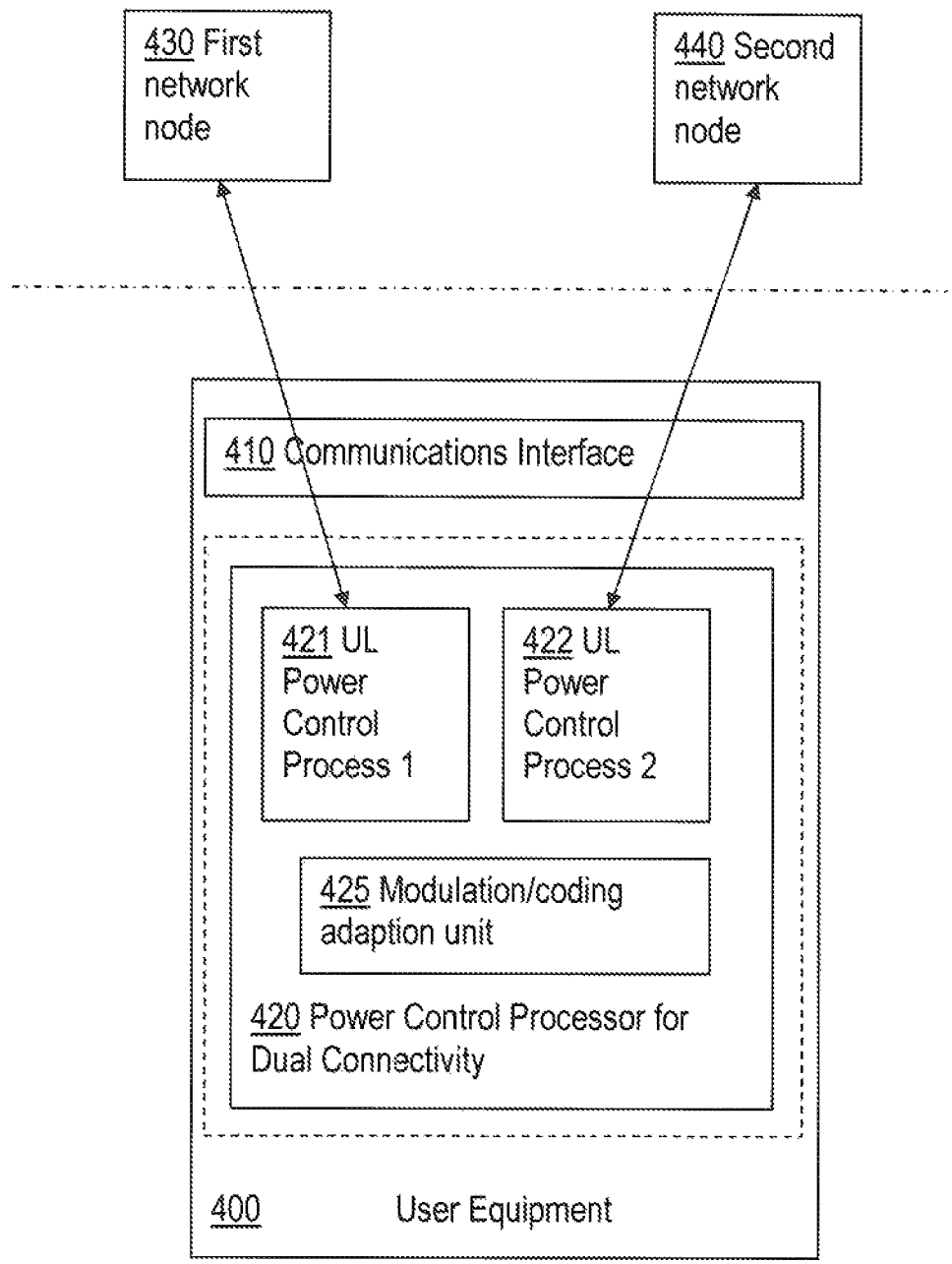
FIG. 4d is a block diagram of a UE adapted for power control of uplink transmissions, the UE being connected in dual connectivity mode according to still an exemplifying embodiment.

In another example embodiment, illustrated in generic fashion by FIG. 4d, the modulation and coding of a transmission may be adapted by the UE 400 to counteract a Tx power back off over a nominal Tx power (which may have been assumed by an eNodeB in determining an associated scheduling grant). To this end, the power control processor of FIG. 4d comprises a modulation/coding adaptation unit 425. In a further embodiment, the UE signals to an eNodeB/node, explicitly or implicitly, which modulation and coding was used for the transmission.

Figure 4E:
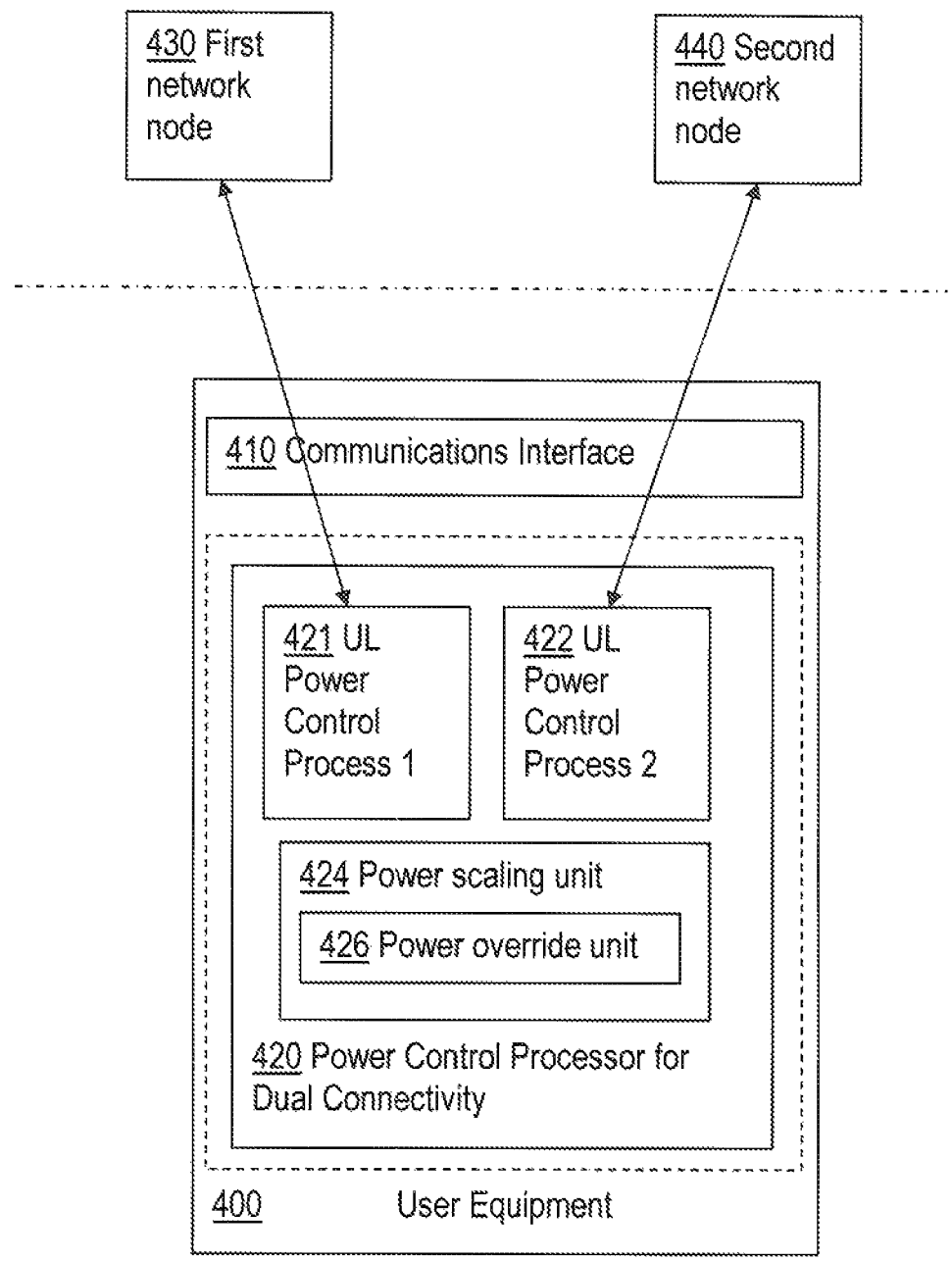
FIG. 4e is a block diagram of a UE adapted for power control of uplink transmissions, the UE being connected in dual connectivity mode according to yet an exemplifying embodiment.

In another further example, illustrated generally by FIG. 4e, a maximum tolerance or override of power difference between the scaled power and the expected power is signalled for each network node. To this end, the scaling unit 424 of the power control processor 420 of FIG. 4e comprises an override unit 426. For each network node (i.e. connectivity), the expected power is calculated only taking into account the transmission for that network node (or connectivity) and assuming no other transmission of other connectivity. The scaled power may be based on other examples. In case the actual difference between the scaled power and the expected power is larger than the signalled maximum tolerance for one network node, when the override feature is invoked the transmitted power for that network node cannot be further scaled. In case not all the actual difference between scaled power and the expected power of each network node can be guaranteed within the given tolerance (s), the power difference between the scaled power and the expected power of higher priority transmission shall be prioritised and guaranteed within the given tolerance.

In another example, the UE may, in addition to max Tx power budget, be limited by pre-defined out-of-band emission limits.

In a further example, any of the above examples or embodiments are applied to respect the pre-defined out-of-band emission limits in addition to the max Tx power budget. For example, out of a plurality of transmissions, the lowest priority transmissions are dropped, until the remaining transmissions can be supported with the available transmission power budget and the out-of-band emission limits.

Figure 4F:
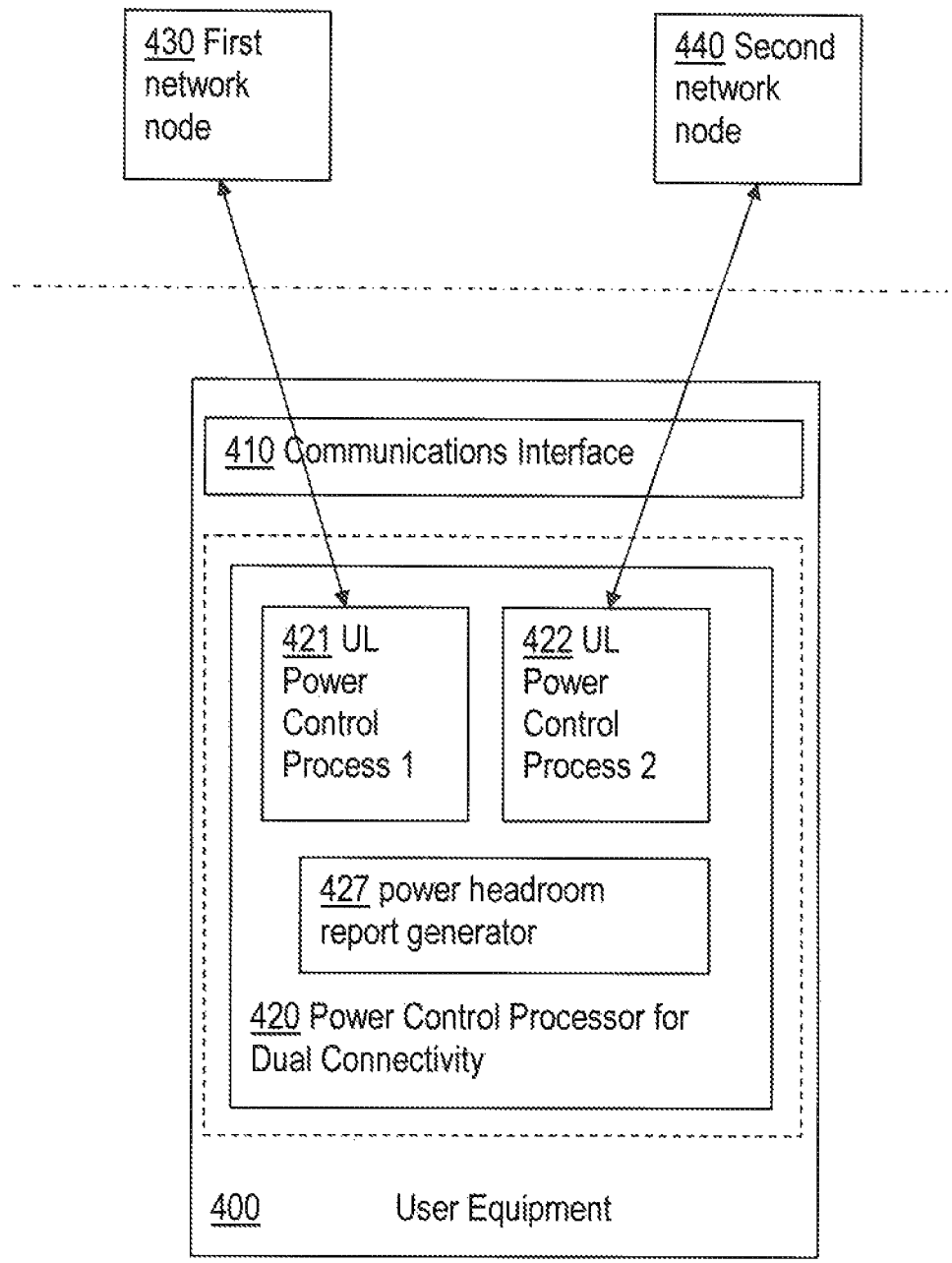
FIG. 4f is a block diagram of a UE adapted for power control of uplink transmissions, the UE being connected in dual connectivity mode according to still another exemplifying embodiment.

FIG. 4f illustrates another example in which the power control processor 420 further comprises a power headroom report generator 427. The power headroom report generator 427 may be configured in various ways, as explained by the nature of the reports and other descriptions provided herein.

In one example, the Power Headroom Reporting, PHR, may be calculated based on whether a simultaneous transmission to the two eNodeBs is required or not.

In another example, multiple PHRs may be reported. Each network node may be provided with one PHR. When the UE calculates the PHR for one network node, the UE may assume no PUCCH/PUSCH transmission for other network nodes.

In another example, multiple PHRs may be reported. Each network node may be provided with one PHR. When the UE 400 calculates the PHR, one PHR calculation may take into account all the PUCCH/PUSCH transmission in the same sub-frame, and other PHR calculation(s) may only consider the PUCCH/PUSCH transmission for the envisioned network node.

In another example, one PHR may be reported. When the UE calculates the PHR, the PUCCH/PUSCH transmission of all the network nodes shall be taken into account. Along with the PHR report, the transmission status of other network nodes may be reported as well. The transmission status report may include: the presence of PUSCH for other network nodes, the number of resource allocation of PUSCH of other network nodes, the presence of PUCCH for other network nodes, etc.

In another example, the UE 400 may make the decision to prioritise one of the transmissions by allocating the needed power based on, for example, the link quality to the different eNodeBs or network nodes.

As used herein, "terminal" or "UE" or "user equipment (UE)" may be a mobile station such as a mobile telephone or "cellular" telephone or a laptop with wireless capability, e.g., mobile termination, and thus may be, for example, a portable, pocket, hand-held, computer-included, or car-mounted mobile device which communicates voice and/or data via a RAN. Moreover, a terminal or UE may be a fixed terminal which communicates voice and/or data via a RAN.

In examples and embodiments described herein or otherwise encompassed hereby, various elements or units which are bounded or enclosed by broken lines, such as the processors described herein, may be realised by a machine platform. The terminology "machine platform" is a way of describing how the functional units may be implemented or realised by machine. The machine platform can take any of several forms, such as (for example) electronic circuitry in the form of a computer implementation platform or a hardware circuit platform. A computer implementation of the machine platform may be realised by or implemented as one or more computer processors or controllers as those terms are herein expansively defined, and which may execute instructions stored on non-transient computer-readable storage media. In such a computer implementation the machine platform may comprise, in addition to a processor (s), a memory section (which in turn can comprise random access memory; read only memory; an application memory (a non-transitory computer readable medium which stores, e.g., coded non instructions which can be executed by the processor to perform acts described herein); and any other memory such as cache memory, for example). Another example platform suitable is that of a hardware circuit, e.g., an Application Specific Integrated Circuit, ASIC, wherein circuit elements are structured and operated to perform the various acts described herein.

In FIG. 3, the UE 300 is also illustrated comprising a receiving arrangement 311 and a transmitting arrangement 312. Through these two arrangements, the UE 300 is adapted to communicate with other nodes and/or entities in the wireless communication network. The receiving arrangement 311 may comprise more than one receiving arrangement. For example, the receiving arrangement may be connected to both a wire and an antenna, by means of which the UE 300 is enabled to communicate with other nodes and/or entities in the wireless communication network. Similarly, the transmitting arrangement 312 may comprise more than one transmitting arrangement, which in turn are connected to both a wire and an antenna, by means of which the UE 300 is enabled to communicate with other nodes and/or entities in the wireless communication network. The UE 300 further comprises a memory 301 for storing data. Further, the UE 300 is illustrated comprising a control or processing unit 306 which in turn is connected to the different units 302-305. It shall be pointed out that this is merely an illustrative example and the UE 300 may comprise more, less or other units or modules which execute the functions of the UE 300 in the same manner as the units illustrated in FIG. 3.

It should be noted that FIG. 3 merely illustrates various functional units in the UE 300 in a logical sense. The functions in practice may be implemented using any suitable software and hardware means/circuits etc. Thus, the embodiments are generally not limited to the shown structures of the UE 300 and the functional units. Hence, the previously described exemplary embodiments may be realised in many ways. For example, one embodiment includes a computer-readable medium having instructions stored thereon that are executable by the control or processing unit 306 for executing the method steps in the UE 300. The instructions executable by the computing system and stored on the computer-readable medium perform the method steps of the UE 300 as set forth in the claims.

Figure 5:
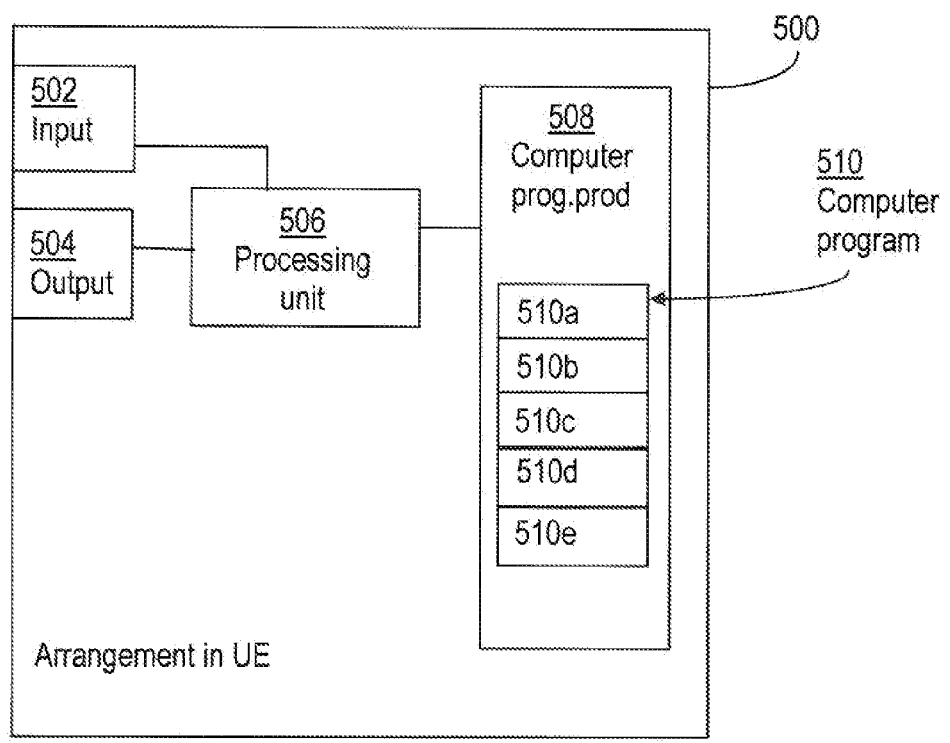
FIG. 5 is a block diagram of an arrangement in a UE adapted for power control of uplink transmissions, the UE being connected in dual connectivity mode according to an exemplifying embodiment.

FIG. 5 schematically shows an embodiment of a UE 500. Comprised in the UE 500 are here a processing unit 506, e.g. with a DSP (Digital Signal Processor). The processing unit 506 may be a single unit or a plurality of units to perform different actions of procedures described herein. The UE 500 may also comprise an input unit 502 for receiving signals from other entities, and an output unit 504 for providing signal(s) to other entities. The input unit and the output unit may be arranged as an integrated entity or as illustrated in the example of FIG. 3, as one or more interfaces 311/312.

Furthermore, the UE 500 comprises at least one computer program product 508 in the form of a non-volatile memory, e.g. an EEPROM (Electrically Erasable Programmable Read-Only Memory), a flash memory and a hard drive. The computer program product 508 comprises a computer program 510, which comprises code means, which when executed in the processing unit 506 in the UE 500 causes the UE 500 to perform the actions e.g. of the procedure described earlier in conjunction with FIG. 2a.

The computer program 510 may be configured as a computer program code structured in computer program modules 510a-510e. Hence, in an exemplifying embodiment, the code means in the computer program of the UE 500 comprises a determining unit, or module, for determining to perform a first uplink transmission to the first network node and a second uplink transmission to the second network node, the uplink transmissions to be performed simultaneously; and for determining a respective first and second uplink transmission power for the first and the second uplink transmission. The computer program further comprises a transmitting unit, or module, for transmitting the first and the second uplink transmissions at the first and the second uplink transmission power respectively when the sum of the first and second uplink transmission power is below a maximum transmission power.

The computer program modules could essentially perform the actions of the flow illustrated in FIG. 2a, to emulate the UE 500. In other words, when the different computer program modules are executed in the processing unit 506, they may correspond to the units 320-350 of FIG. 3.

Although the code means in the embodiments disclosed above in conjunction with FIG. 3 are implemented as computer program modules which when executed in the processing unit causes the UE to perform the actions described above in the conjunction with figure mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the UE.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

Although the description above contains many specificities, these should not be construed as limiting the scope of the invention but as merely providing illustrations of some of the presently preferred embodiments of this invention. It will be appreciated that the scope of the present invention fully encompasses other embodiments which may become obvious to those skilled in the art, and that the scope of the present invention is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the present invention, for it to be encompassed hereby.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method performed by a User Equipment, UE, for power control of uplink transmissions, the UE being connected in dual connectivity mode to at least a first network node and a second network node, the method comprising:
   determining to perform a first uplink transmission to the first network node and a second uplink transmission to the second network node, the uplink transmissions to be performed simultaneously,
   determining a respective first and second uplink transmission power for the first and the second uplink transmission,
   determining if the first and the second uplink transmission can be performed without exceeding a first or second maximum tolerance value and a maximum transmission power, and if not, transmitting the transmission having the highest priority at a transmission power indicated by the maximum tolerance value for that transmission, and
   transmitting the first and the second uplink transmissions at the first and the second uplink transmission power respectively when the sum of the first and second uplink transmission power is below the maximum transmission power,
   wherein the first and second maximum tolerance values indicate to the UE the respective maximum allowed deviations between an expected transmission power and an actual transmission power of the first and second uplink transmissions.

2. A method according to claim 1, wherein if the sum of the first and the second uplink transmission power exceeds the maximum transmission power, the method comprising prioritising between the first and the second uplink transmission according to a predetermined rule.

3. A method according to claim 2, wherein the predetermined rule indicates to the UE to prioritise the first or the second uplink transmission based on a link quality between the UE and the first and the second network node respectively.

4. A method according to claim 2, wherein the first uplink transmission comprises control information and the second uplink transmission comprises data, wherein the predetermined rule indicates to the UE to prioritise the uplink transmission comprising control information by transmitting the first uplink transmission at the first uplink transmission power.

5. A method according to claim 4, further comprising transmitting the second uplink transmission at a transmission power of the maximum transmission power minus the first uplink transmission power.

6. A method according to claim 4, further comprising refraining from transmitting the second uplink transmission if the transmission power of the maximum transmission power minus the first uplink transmission power is below a first predefined threshold.

7. A method according to claim 2, wherein the predetermined rule indicates to the UE to scale at least the first uplink transmission power based on a first scaling factor and then transmitting the first and the second uplink transmission at the scaled transmission power.

8. A method according to claim 7, wherein the predetermined rule indicates to the UE to scale the second uplink transmission power based on a second scaling factor and then transmitting the first uplink transmission at the scaled first uplink transmission power and transmitting the second uplink transmission at the scaled second uplink transmission power.

9. A method according to claim 1, further comprising receiving, from the first and the second network node, the respective first and second maximum tolerance values.

10. A method according to claim 2, wherein the predetermined rule indicates to the UE to adapt modulation and/or coding of at least one of the first and the second uplink transmission due to reduced uplink transmission power, the method further comprising the UE signalling to the first and/or second network node the modulation and/or coding to be used and transmitting the first and/or the second uplink transmissions at the adapted modulation and/or coding.

11. A method according to claim 1, further comprising calculating a Power Headroom Reporting, PHR, based on whether simultaneous transmission of the first uplink transmission to the first network node and the second uplink transmission to the second network node is required or not.

12. A method according to claim 11, further comprising calculating a first PHR for the first uplink transmission to the first network node and a second PHR for the second uplink transmission to the second network node and reporting the first PHR to the first network node and the second PHR to the second network node.

13. A method according to claim 11, further comprising calculating one PHR for both the first uplink transmission and the second uplink transmission and reporting the one calculated PHR to both the first network node and the second network node.

14. A non-transitory computer-readable storage medium containing instructions, which when executed by one or more processors, causes a User Equipment to perform the method according to claim 1.

15. A User Equipment, UE, connectable in dual connectivity mode to at least a first network node and a second network node, the UE comprising:
  a power controller configured to determine to perform a first uplink transmission to the first network node and a second uplink transmission to the second network node, the uplink transmissions to be performed simultaneously, and determine a respective first and second uplink transmission power for the first and the second uplink transmission, and
  a transmitter configured to transmit the first and the second uplink transmissions at the first and the second uplink transmission power respectively when the sum of the first and second uplink transmission power is below a maximum transmission power,
  wherein the power controller is further configured to determine if the first and the second uplink transmission can be performed without exceeding a first or second maximum tolerance value and the maximum transmission power, and if not, the transmitter is configured to transmit the transmission having the highest priority at a transmission power indicated by the maximum tolerance value for that transmission, and
  wherein the first and second maximum tolerance values indicate to the UE the respective maximum allowed deviations between an expected transmission power and an actual transmission power of the first and second uplink transmissions.

16. A UE according to claim 15, further comprising a prioritiser, wherein if the sum of the first and the second uplink transmission power exceeds the maximum transmission power, the prioritiser is adapted to prioritise between the first and the second uplink transmission according to a predetermined rule.

17. A UE according to claim 16, wherein the predetermined rule indicates to the UE to prioritise the first or the second uplink transmission based on a link quality between the UE and the first and the second network node respectively.

18. A UE according to claim 16, wherein the first uplink transmission comprises control information and the second uplink transmission comprises data, wherein the predetermined rule indicates to the UE to prioritise the uplink transmission comprising control information by transmitting the first uplink transmission at the first uplink transmission power.

19. A UE according to claim 18, wherein the transmitter is further configured to transmit the second uplink transmission at a transmission power of the maximum transmission power minus the first uplink transmission power.

20. A UE according to claim 18, wherein the transmitter is further configured to refrain from transmitting the second uplink transmission if the transmission power of the maximum transmission power minus the first uplink transmission power is below a first predefined threshold.

21. A UE according to claim 16, wherein the predetermined rule indicates to the UE to scale at least the first uplink transmission power based on a first scaling factor and then transmitting the first and the second uplink transmission at the scaled transmission power.

22. A UE according to claim 21, wherein the predetermined rule indicates to the UE to scale the second uplink transmission power based on a second scaling factor, wherein the transmitter is configured to transmit the first uplink transmission at the scaled first uplink transmission power and transmit the second uplink transmission at the scaled second uplink transmission power.

23. A UE according to claim 21, further comprising a receiver configured to receive, from the first and the second network node, the respective first and second maximum tolerance values.

24. A UE according to claim 16, wherein the predetermined rule indicates to the UE to adapt modulation and/or coding of at least one of the first and the second uplink transmission due to reduced uplink transmission power, wherein the transmitter is further configured to signal to the first and/or second network node the modulation and/or coding to be used and transmit the first and/or the second uplink transmissions at the adapted modulation and/or coding.

25. A UE according to claim 15, further comprising a power headroom report generator configured to calculate a Power Headroom Reporting, PHR, based on whether simultaneous transmission of the first uplink transmission to the first network node and the second uplink transmission to the second network node is required or not.

26. A UE according to claim 25, wherein the power headroom report generator is further configured to calculate a first PHR for the first uplink transmission to the first network node and a second PHR for the second uplink transmission to the second network node and the transmitter is configured to report the first PHR to the first network node and the second PHR to the second network node.

27. A UE according to claim 25, wherein the power headroom report generator is further configured to calculate one PHR for both the first uplink transmission and the second uplink transmission and the transmitter is configured to report the one calculated PHR to both the first network node and the second network node.

* * * * *